United States Patent
Weingaertner et al.

(10) Patent No.: US 12,312,697 B2
(45) Date of Patent: *May 27, 2025

(54) ELECTROLYZER SYSTEM WITH STEAM GENERATION AND METHOD OF OPERATING SAME

(71) Applicant: Bloom Energy Corporation, San Jose, CA (US)

(72) Inventors: David Weingaertner, Sunnyvale, CA (US); Andy Ta, San Jose, CA (US); Navaneethakrishnan Govindarasu, Sunnyvale, CA (US); Siddharth Patel, Milpitas, CA (US); Kim Nguyen, Fremont, CA (US); Nandan Joshi, San Jose, CA (US); Shannon Bell, Chula Vista, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 490 days.

This patent is subject to a terminal disclaimer.

(21) Appl. No.: 17/746,275

(22) Filed: May 17, 2022

(65) Prior Publication Data

US 2022/0372636 A1    Nov. 24, 2022

Related U.S. Application Data

(60) Provisional application No. 63/216,995, filed on Jun. 30, 2021, provisional application No. 63/190,049, filed on May 18, 2021.

(51) Int. Cl.
  *C25B 1/042* (2021.01)
  *C25B 9/67* (2021.01)
  (Continued)

(52) U.S. Cl.
  CPC ............ *C25B 1/042* (2021.01); *C25B 9/67* (2021.01); *C25B 15/021* (2021.01); *C25B 15/08* (2013.01)

(58) Field of Classification Search
  CPC .......... C25B 1/042; C25B 9/67; C25B 15/021
  See application file for complete search history.

(56) References Cited

U.S. PATENT DOCUMENTS

| | | | |
|---|---|---|---|
| 5,037,525 A | 8/1991 | Badwal | |
| 5,479,462 A | 12/1995 | Yamauchi et al. | |
| (Continued) | | | |

FOREIGN PATENT DOCUMENTS

| | | |
|---|---|---|
| CN | 101532161 B | 1/2011 |
| CN | 104032059 B | 11/2015 |
| (Continued) | | |

OTHER PUBLICATIONS

Extended search report from the European Patent Office dated Nov. 24, 2022 in corresponding Application No. 22173906.3.
(Continued)

*Primary Examiner* — Ciel P Contreras
(74) *Attorney, Agent, or Firm* — THE MARBURY LAW GROUP PLLC

(57) ABSTRACT

An electrolyzer system includes a steam generator configured to generate steam, a stack of solid oxide electrolyzer cells configured to generate a hydrogen stream using the steam received from the steam generator, and a water preheater configured to preheat water provided to the steam generator using heat extracted from oxygen exhaust output from the stack.

28 Claims, 16 Drawing Sheets

(51) Int. Cl.
*C25B 15/021* (2021.01)
*C25B 15/08* (2006.01)

(56) References Cited

U.S. PATENT DOCUMENTS

| | | | |
|---|---|---|---|
| 6,051,125 | A | 4/2000 | Pham et al. |
| 7,276,306 | B2 | 10/2007 | Pham et al. |
| 7,291,255 | B2 | 11/2007 | Fujimura et al. |
| 7,892,407 | B2 | 2/2011 | Gibson et al. |
| 9,297,086 | B2 | 3/2016 | Delahaye et al. |
| 9,917,311 | B2 | 3/2018 | Planque et al. |
| 10,290,886 | B2 | 5/2019 | Chatroux et al. |
| 10,378,117 | B2 | 8/2019 | Colomar |
| 10,651,482 | B2 | 5/2020 | Lorio et al. |
| 12,091,759 | B2 * | 9/2024 | Weingaertner ........ C25B 15/021 |
| 2003/0211375 | A1 | 11/2003 | Ruhl |
| 2007/0048605 | A1 | 3/2007 | Pez et al. |
| 2007/0163889 | A1 | 7/2007 | Kato et al. |
| 2007/0217995 | A1 | 9/2007 | Matsumura et al. |
| 2008/0254333 | A1 | 10/2008 | Yoshino et al. |
| 2009/0152106 | A1 | 6/2009 | Yamauchi et al. |
| 2011/0079966 | A1 | 4/2011 | Fleury et al. |
| 2011/0132770 | A1 | 6/2011 | Sala et al. |
| 2012/0171596 | A1 * | 7/2012 | Hilliard ............... H01M 8/2435 |
| | | | 204/260 |
| 2014/0030633 | A1 | 1/2014 | Palermo et al. |
| 2017/0207745 | A1 | 7/2017 | Ishihara et al. |
| 2018/0287179 | A1 | 10/2018 | Rueger et al. |
| 2019/0245224 | A1 | 8/2019 | Lacroix et al. |
| 2023/0013942 | A1 | 1/2023 | Weingaertner et al. |
| 2023/0155214 | A1 | 5/2023 | Weingaertner et al. |

FOREIGN PATENT DOCUMENTS

| | | |
|---|---|---|
| CN | 111139493 B | 4/2021 |
| DE | 4002258 A1 | 8/1991 |
| DE | 19540993 C1 | 7/1997 |
| EP | 3221494 B1 | 6/2019 |
| EP | 3729548 A1 | 10/2020 |
| EP | 3795705 A1 | 3/2021 |
| JP | 2659824 B2 | 9/1997 |
| JP | 2934517 B2 | 8/1999 |
| JP | 3073377 B2 | 8/2000 |
| JP | 3095434 B2 | 10/2000 |
| JP | 3241306 B2 | 12/2001 |
| JP | 3349382 B2 | 11/2002 |
| JP | 3377642 B2 | 2/2003 |
| JP | 2005281198 A | 10/2005 |
| JP | 2006307290 A | 11/2006 |
| JP | 4327687 B2 | 9/2009 |
| JP | 4351968 B2 | 10/2009 |
| JP | 2010106798 A | 5/2010 |
| JP | 5005896 B2 | 8/2012 |
| JP | 5005898 B2 | 8/2012 |
| JP | 5514266 B2 | 6/2014 |
| JP | 2015147996 A | 8/2015 |
| JP | 5854522 B2 | 2/2016 |
| JP | 5879881 B2 | 3/2016 |
| JP | 2016110913 A | 6/2016 |
| JP | 2016115592 A | 6/2016 |
| JP | 6292382 B2 | 3/2018 |
| JP | 6317710 B2 | 4/2018 |
| JP | 6317711 B2 | 4/2018 |
| JP | 2018513915 A | 5/2018 |
| JP | 6381493 B2 | 8/2018 |
| JP | 2018184631 A | 11/2018 |
| JP | 6574351 B2 | 9/2019 |
| JP | 6603607 B2 | 11/2019 |
| JP | 2019196028 A | 11/2019 |
| KR | 100226331 B1 | 10/1999 |
| KR | 100408261 B1 | 12/2003 |
| KR | 101146762 B1 | 5/2012 |
| KR | 20150003485 A | 1/2015 |
| KR | 20160012414 A | 2/2016 |
| WO | 2015180752 A1 | 12/2015 |
| WO | 2019130619 A1 | 7/2019 |
| WO | 2020235266 A1 | 11/2020 |
| WO | 2020235267 A1 | 11/2020 |

OTHER PUBLICATIONS

Mehrpooya Mehdi et al: "Energy analysis and economic evaluation of a new developed integrated process configuration to produce power, hydrogen, and heat", Journal of Cleaner Production, Elsevier, Amsterdam, NL, vol. 239, Aug. 15, 2019 (Aug. 15, 2019), XP085816980, ISSN: 0959-6526, DOI: 10.1016/J.JCLEPRO.2019.118042.

* cited by examiner

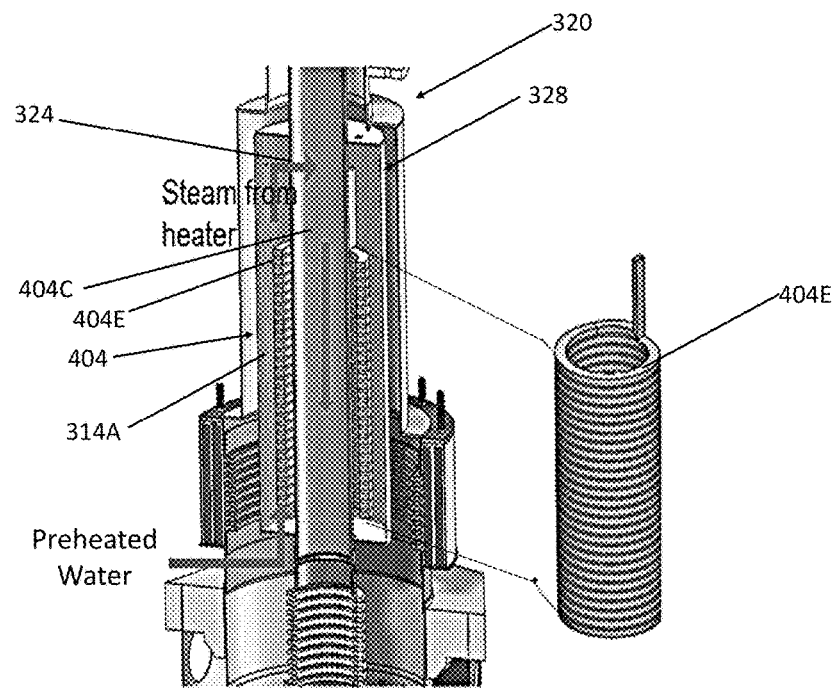
FIG. 6
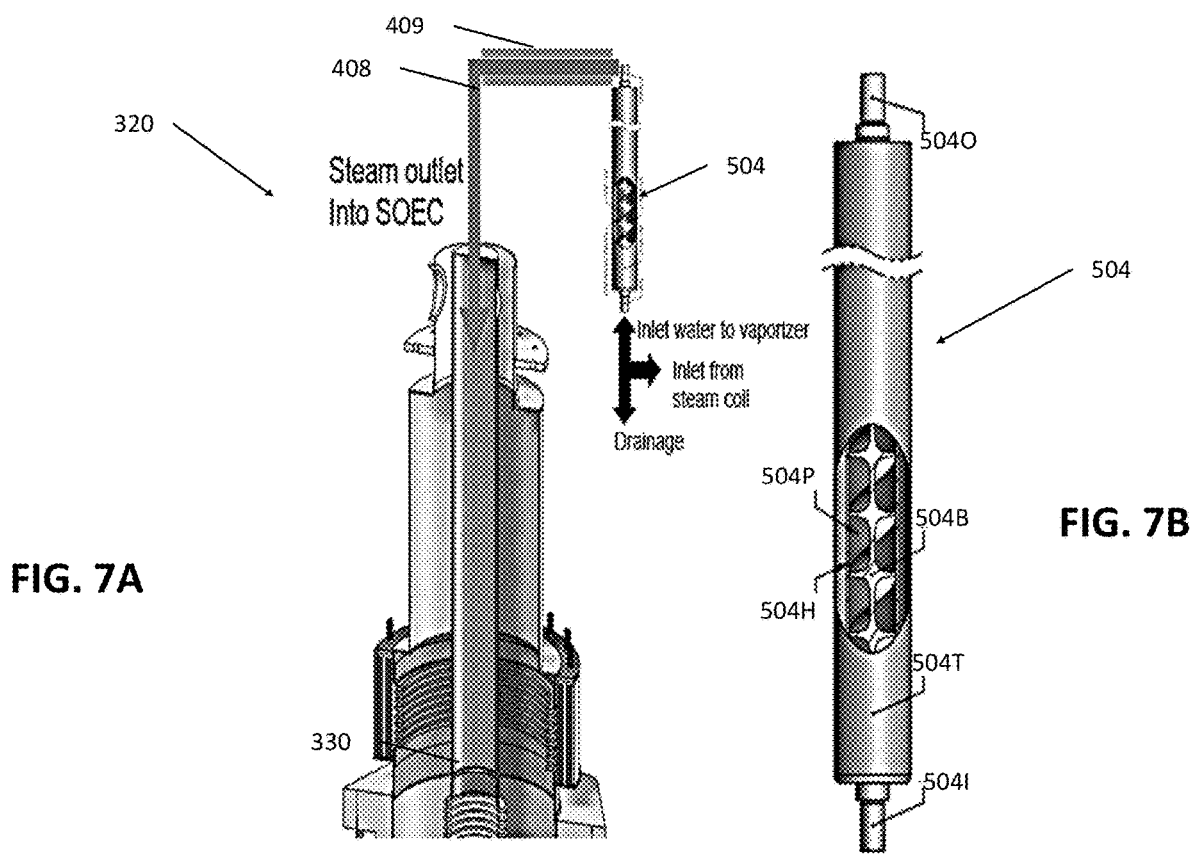
FIG. 7A
FIG. 7B

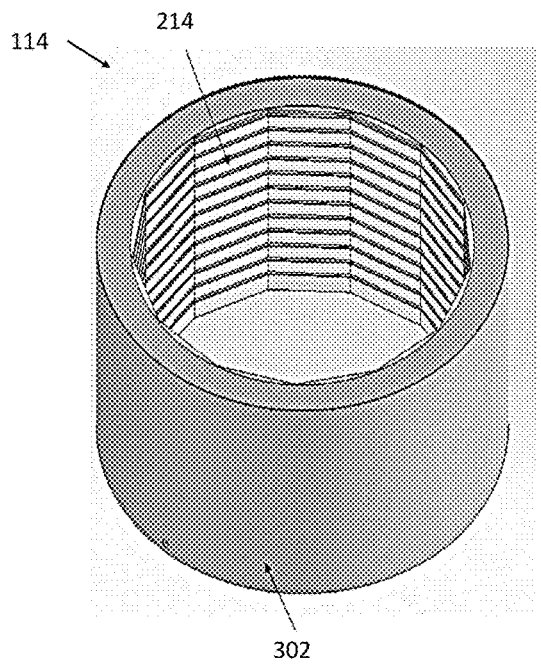
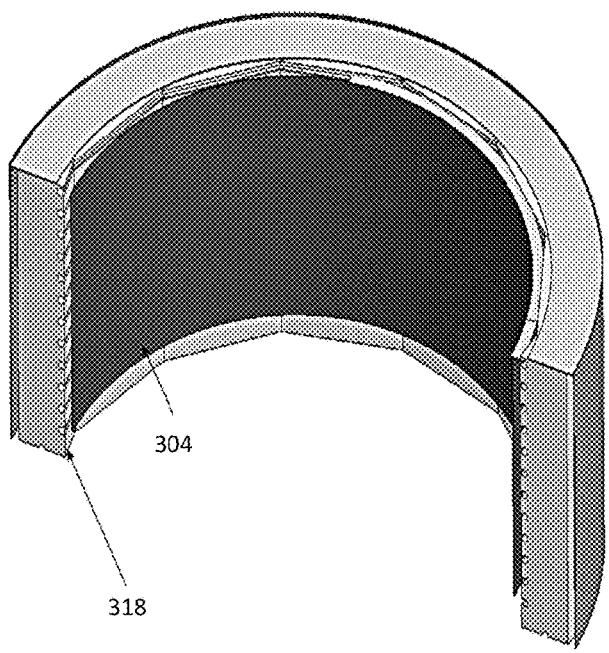
FIG. 8C
FIG. 8D
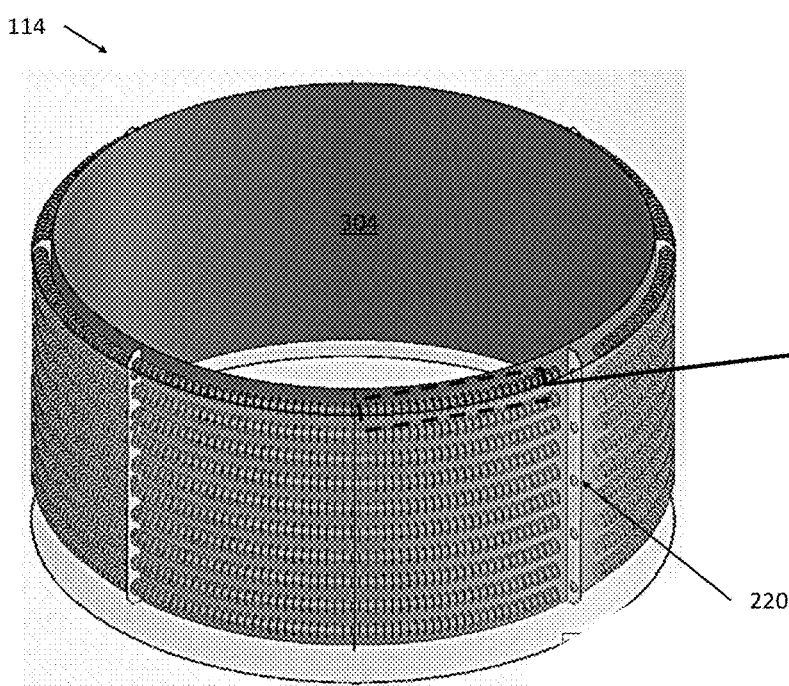
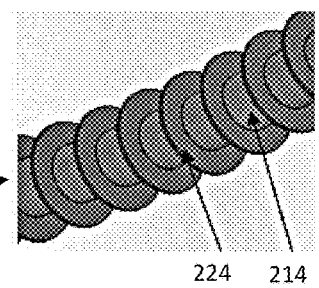
FIG. 8E

ELECTROLYZER SYSTEM WITH STEAM GENERATION AND METHOD OF OPERATING SAME

PRIORITY APPLICATIONS

This application is a non-provisional application that claims the benefit of U.S. Provisional Application No. 63/190,049, filed on May 18, 2021, and U.S. Provisional Application No. 63/216,995, filed on Jun. 30, 2021, the contents of each of which are herein incorporated by reference in their entirety.

FIELD

The present invention is directed to electrolyzer systems including solid oxide electrolyzer cells (SOEC) and methods of operating the same.

BACKGROUND

Solid oxide fuel cells (SOFC) can be operated as an electrolyzer in order to produce hydrogen and oxygen, referred to as solid oxide electrolyzer cells (SOEC). In SOFC mode, oxide ions are transported from the cathode side (air) to the anode side (fuel) and the driving force is the chemical gradient of partial pressure of oxygen across the electrolyte. In SOEC mode, a positive potential is applied to the air side of the cell and the oxide ions are now transported from the fuel side to the air side. Since the cathode and anode are reversed between SOFC and SOEC (i.e. SOFC cathode is SOEC anode, and SOFC anode is SOEC cathode), going forward, the SOFC cathode (SOEC anode) will be referred to as the air electrode, and the SOFC anode (SOEC cathode) will be referred to as the fuel electrode. During SOEC mode, water in the fuel stream is reduced ($H_2O+2e^-\rightarrow O^{2-}+H_2$) to form $H_2$ gas and $O^{2-}$ ions, $O^{2-}$ ions are transported through the solid electrolyte, and then oxidized on the air side ($O^{2-}$ to $O_2$) to produce molecular oxygen. Since the open circuit voltage for a SOFC operating with air and wet fuel (hydrogen, reformed natural gas) is on the order of 0.9 to 1V (depending on water content), the positive voltage applied to the air side electrode in SOEC mode raises the cell voltage up to typical operating voltages of 1.1 to 1.3V.

SUMMARY

In various embodiments, an electrolyzer system comprises a steam generator configured to generate steam, a stack of solid oxide electrolyzer cells configured to generate a hydrogen stream using the steam received from the steam generator, and a water preheater configured to preheat water provided to the steam generator using heat extracted from oxygen exhaust, typically enriched air having higher oxygen content than normal air, output from the stack.

In various embodiments, a method of operating an electrolyzer system comprises providing steam into a solid oxide electrolyzer stack, generating a hydrogen stream in the solid oxide electrolyzer stack, and at least one of: (a) preheating water provided to a steam generator to generate the steam using heat extracted from oxygen exhaust output from the stack; or (b) mixing hydrogen into the steam before providing the steam into the stack; or (c) providing air into the stack; or (d) preheating air by extracting heat from oxygen exhaust output from the stack, and providing the preheated air into the stack; or (e) heating the steam using heat extracted from the hydrogen stream prior to providing the steam into the stack.

In various embodiments, an electrolyzer system comprises a hotbox, a central column disposed in the hotbox and extending lengthwise in a vertical direction, stacks of solid oxide electrolyzer cells disposed in the hotbox, surrounding the central column, and configured to convert steam into a hydrogen stream, and an air heater configured to heat air provided to the stacks.

In various embodiments, an electrolyzer system comprises a hotbox, a central column disposed in the hotbox, stacks of solid oxide electrolyzer cells disposed in the hotbox, and surrounding the central column, and configured to receive steam and air and to output a hydrogen exhaust and an oxygen exhaust, an air recuperator configured to preheat air provided to the hotbox by extracting heat from oxygen exhaust output from the stacks, an air heater configured to heat preheated air output from the air recuperator and provide heated air to the stacks, and a steam heater disposed in the central column and configured to superheat steam provided to the stacks.

FIGURES

Figure 4A:
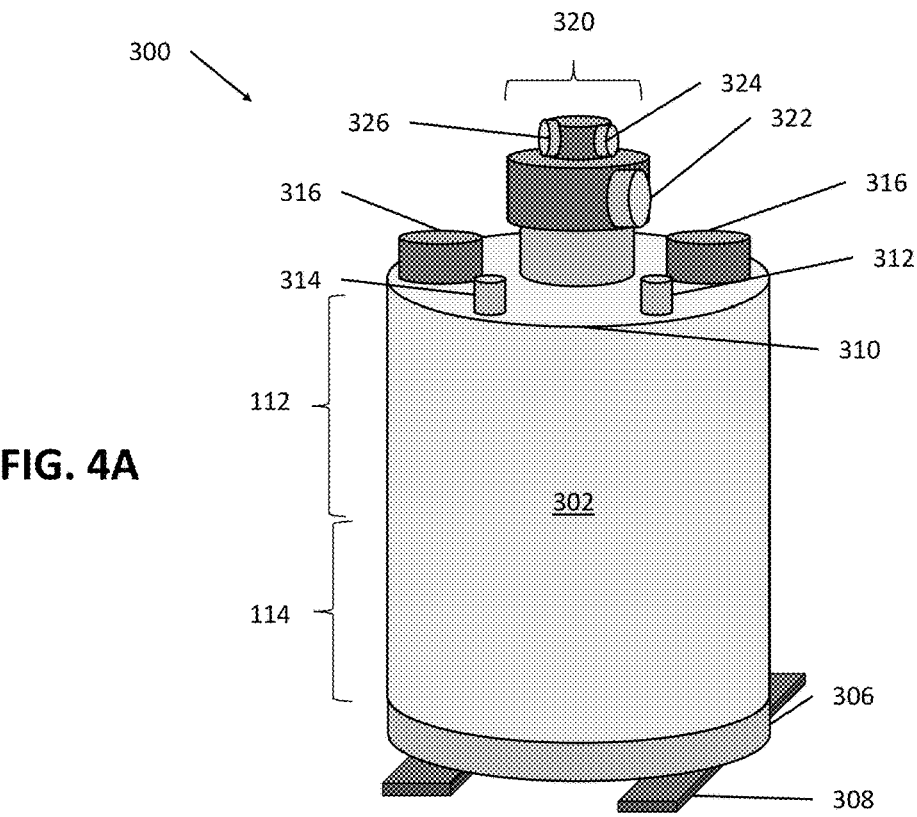
FIG. 4A is a perspective view of a hotbox, according to various embodiments of the present disclosure.
Figure 4B:
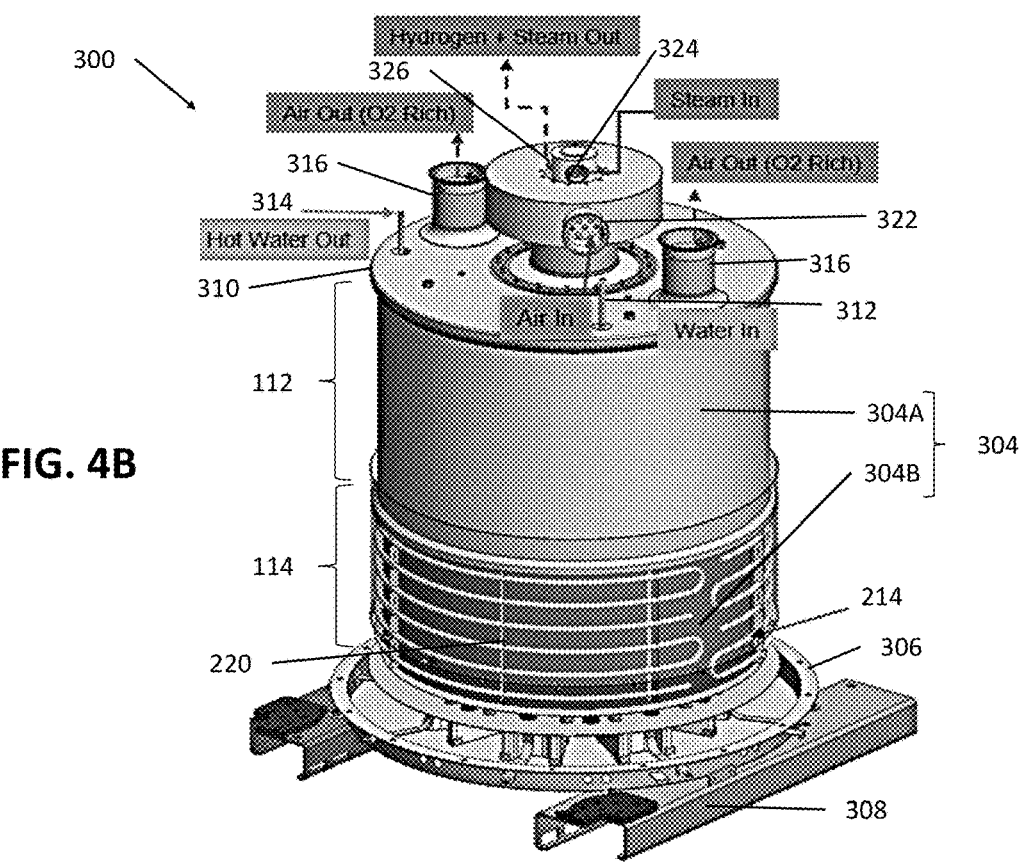
FIG. 4B is a perspective view of the hotbox, with its outer shell removed.
Figure 5A:
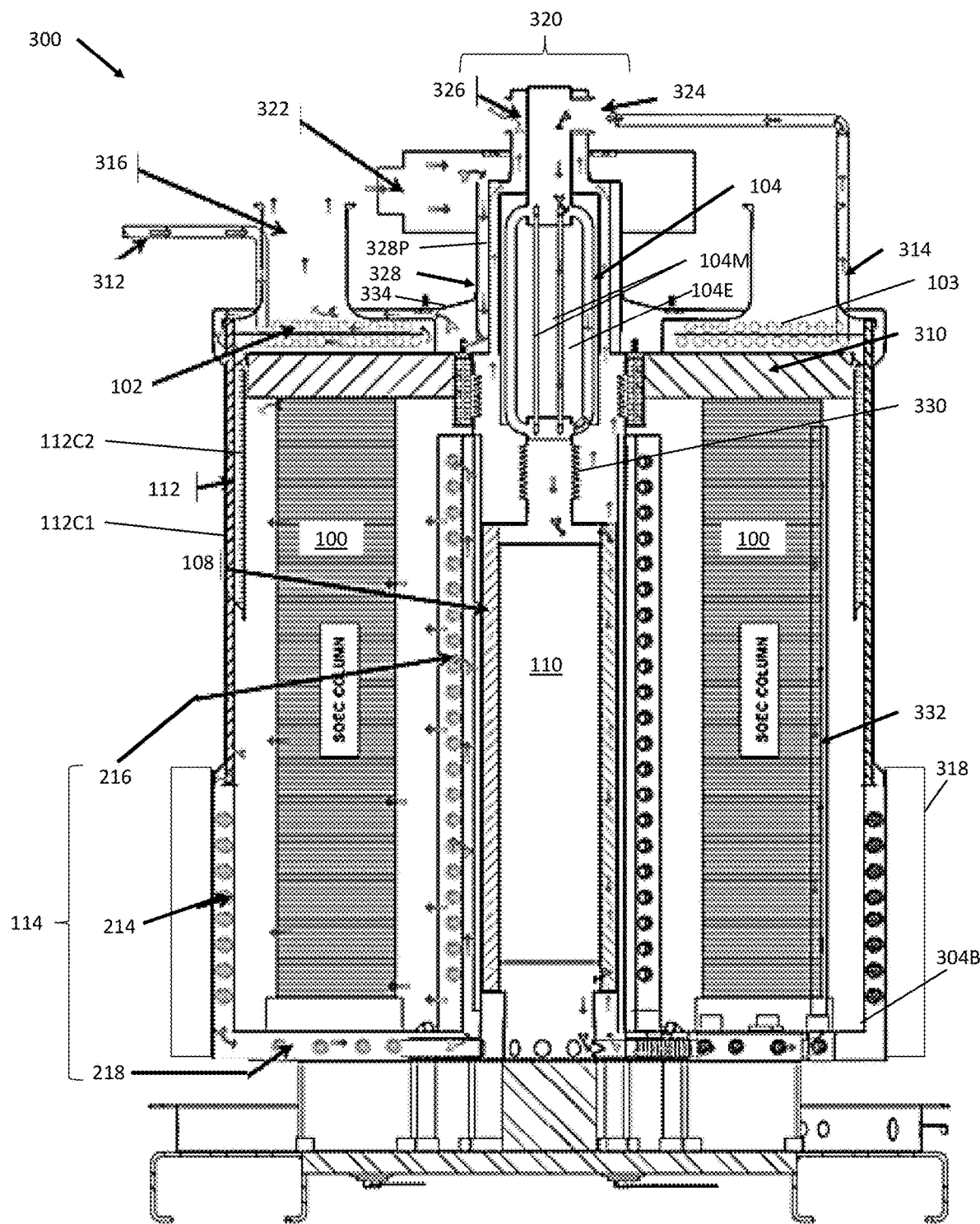
Figure 5B:
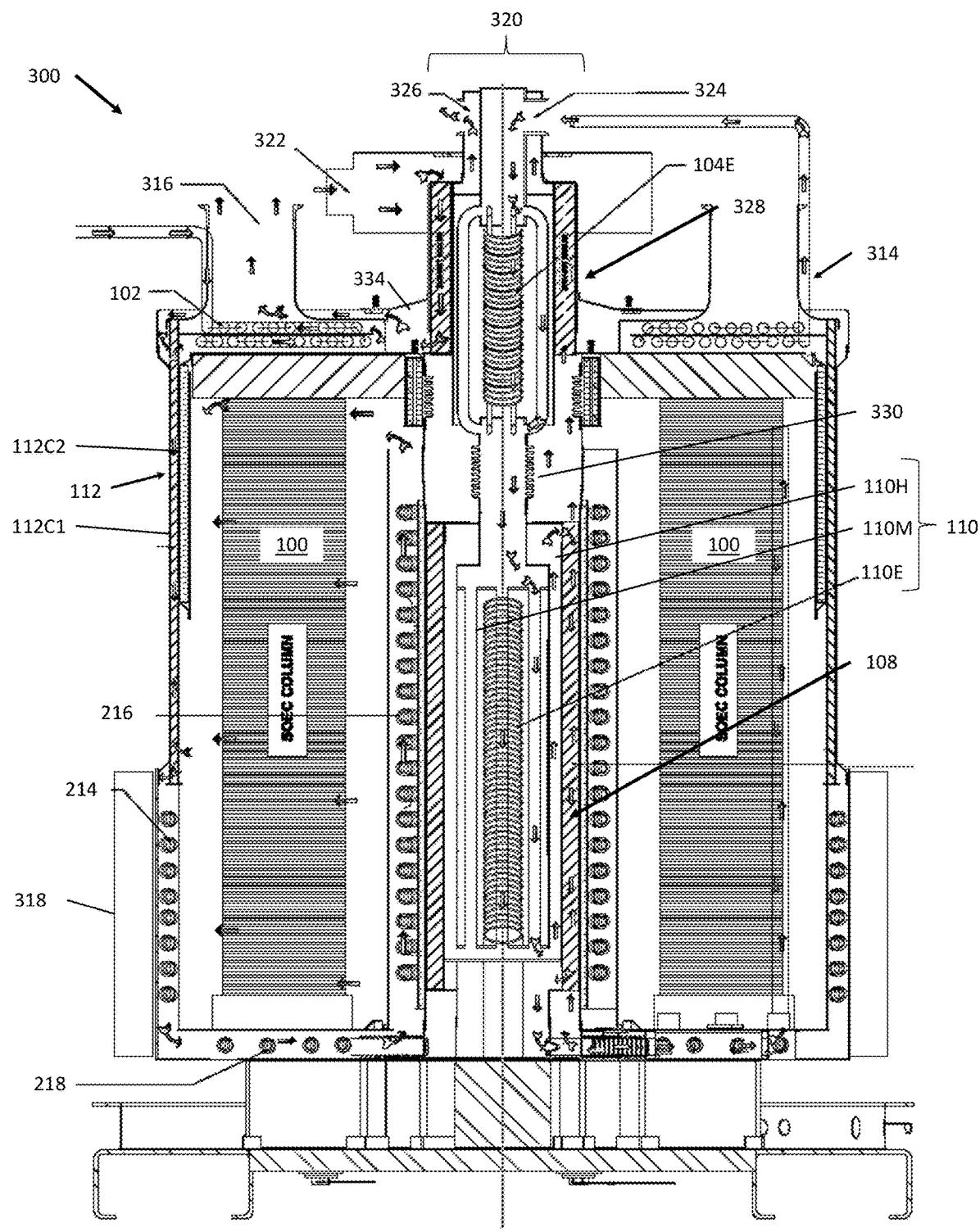
Figure 5C:
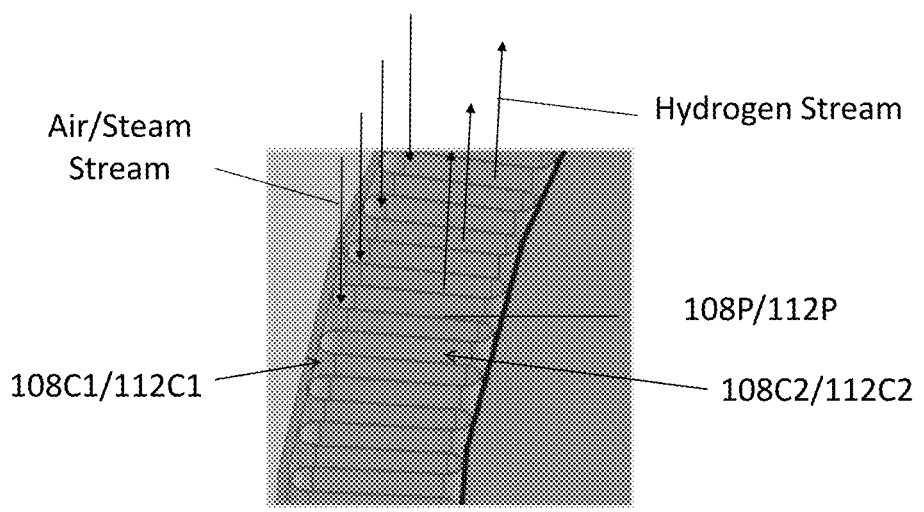
Figure 5D:
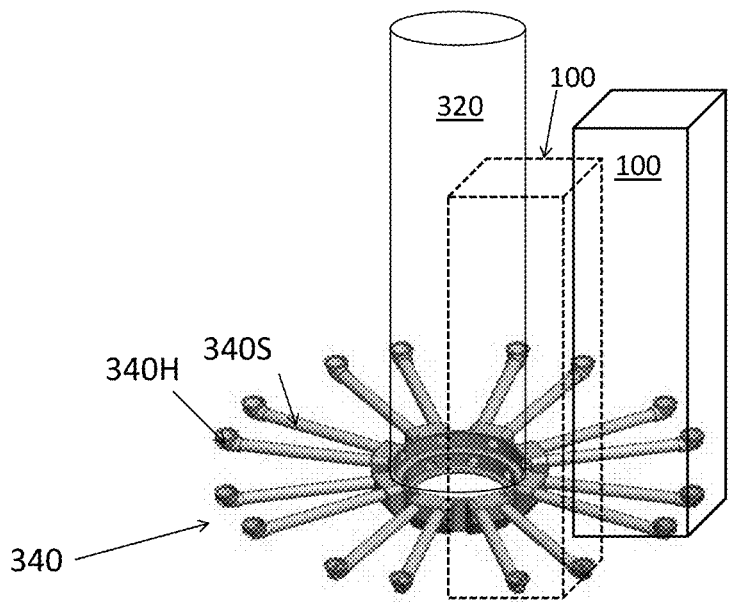

FIG. 5A is a cross-sectional view of the hotbox of FIGS. 4A and 4B, according to various embodiments of the present disclosure, FIG. 5B a cross-sectional view of the hotbox 300, showing components disposed inside of the central column, FIG. 5C is a partial perspective view showing elements of a steam recuperator and air preheater of the hotbox, and FIG. 5D is a perspective view showing a distribution hub of the hotbox.

FIG. 6 is a cross-sectional perspective view of a central column 320 including a modified steam generator 404, according to various embodiments of the present disclosure.

Figure 7C:
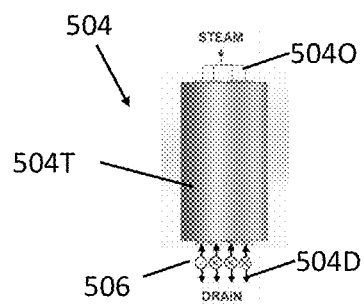

FIG. 7A is a cross-sectional perspective view of a central column and an external steam generator, according to various embodiments of the present disclosure, and FIG. 7B is an enlarged partial cross-sectional view of the steam generator of FIG. 7A. FIGS. 7C, 7D, 7E and 7F are perspective views of external steam generators according to alternative embodiments of the present disclosure.

FIGS. 8A-8F are perspective views showing heating element configurations, according to various embodiments of the present disclosure.

Figure 9A:
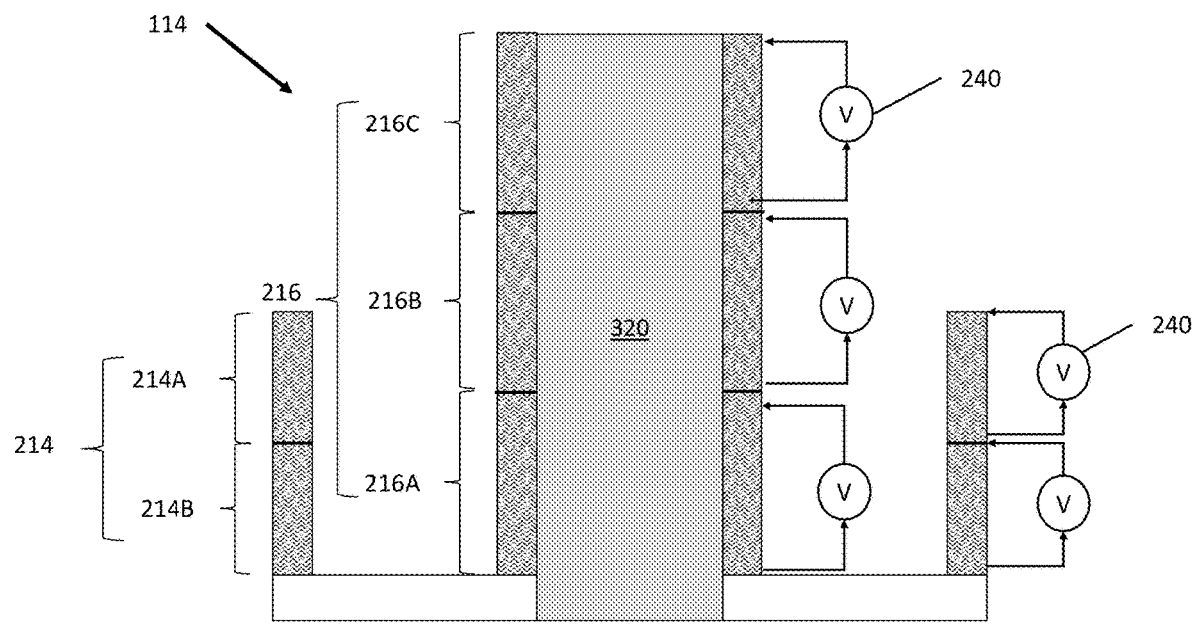
Figure 9B:
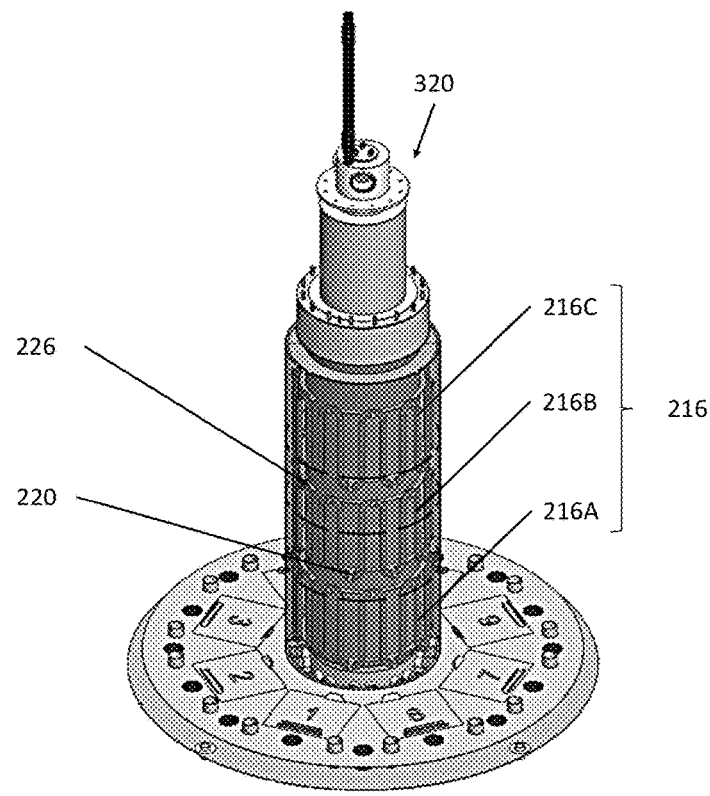

FIG. 9A is a schematic view showing an air heater having a zoned configuration, according to various embodiments of the present disclosure, and FIG. 9B is a perspective view showing a heating element of the air heater of FIG. 9A.

Figure 10A:
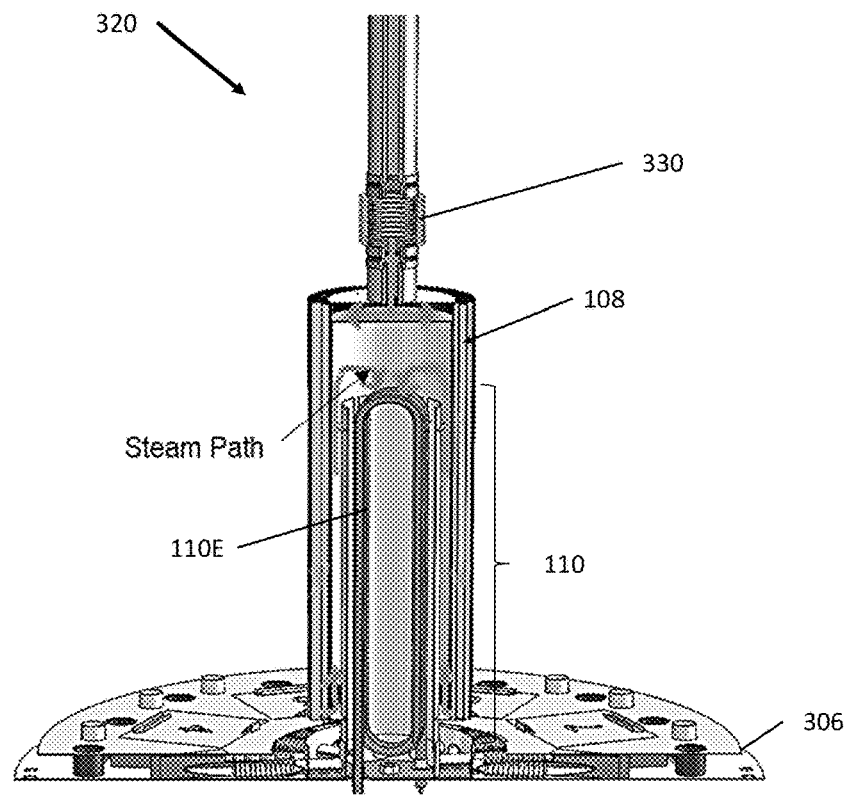
Figure 10B:
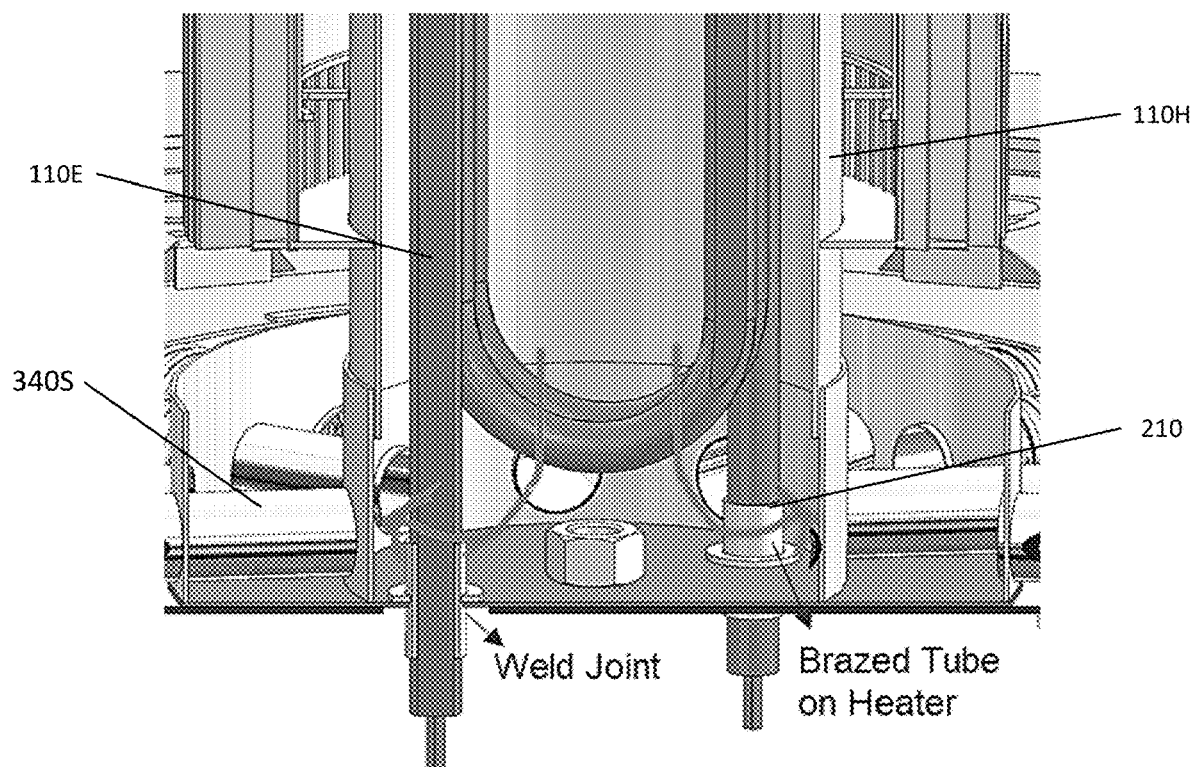

FIG. 10A is a cross-sectional view of the central column including a modified steam heating element, according to various embodiments of the present disclosure, and FIG. 10B is an enlarged portion of FIG. 10A.

Figure 11:
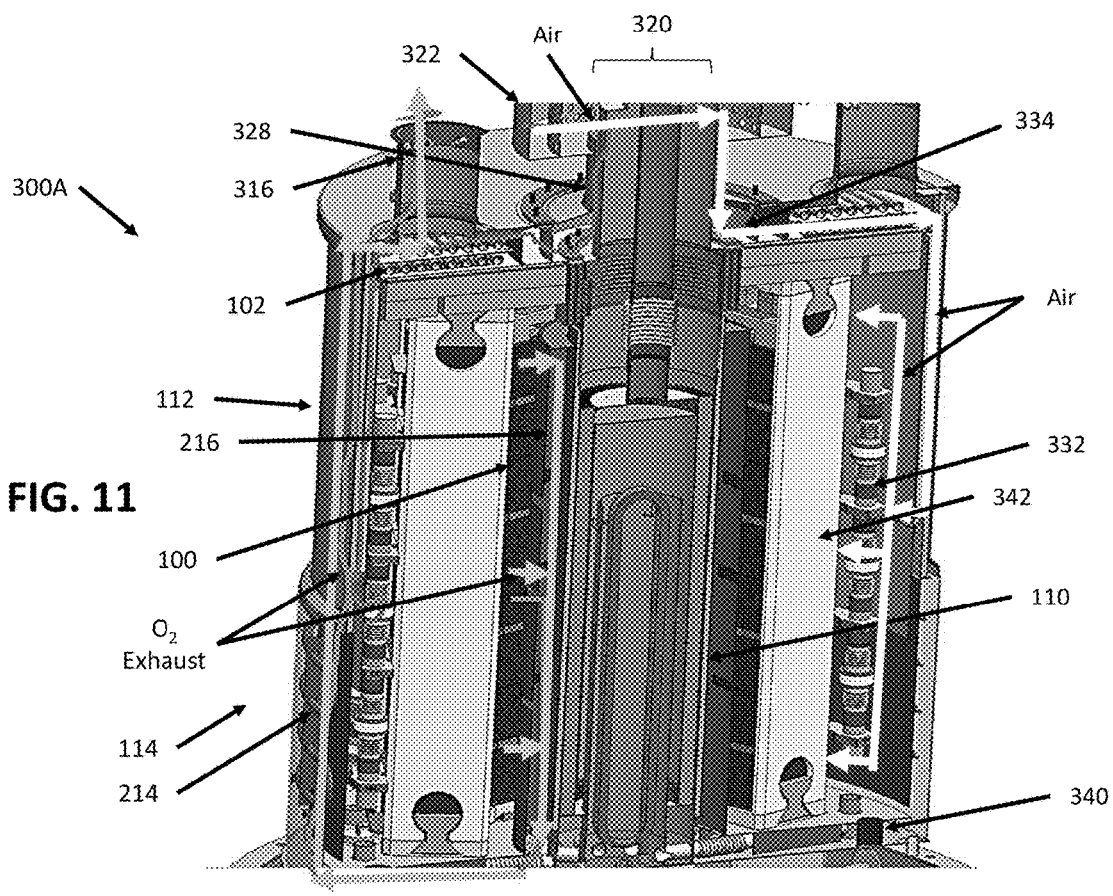

FIG. 11 is a cross-sectional perspective view showing air flow through a modified hotbox, according to various embodiments of the present disclosure.

Figure 12:
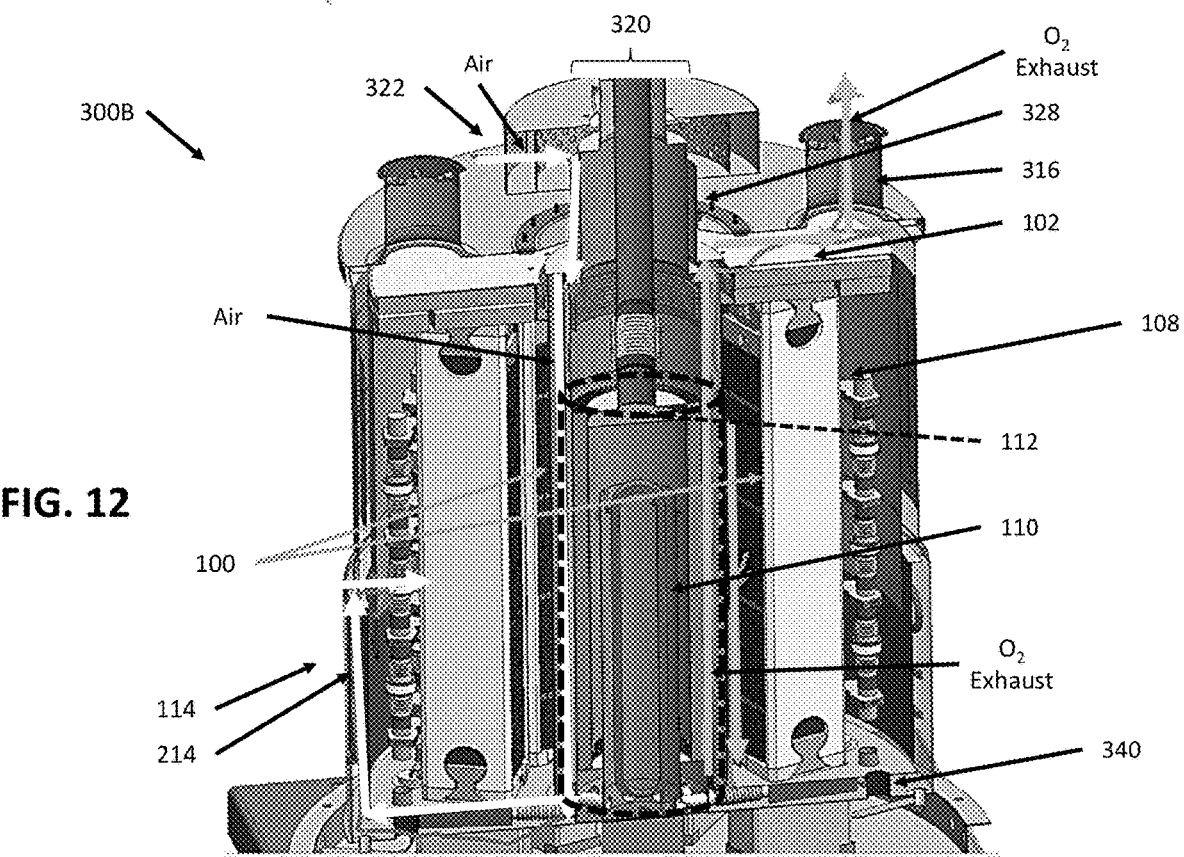

FIG. 12 is a cross-sectional perspective view showing air flow through a modified hotbox, according to various embodiments of the present disclosure.

DETAILED DESCRIPTION

Figure 1A:
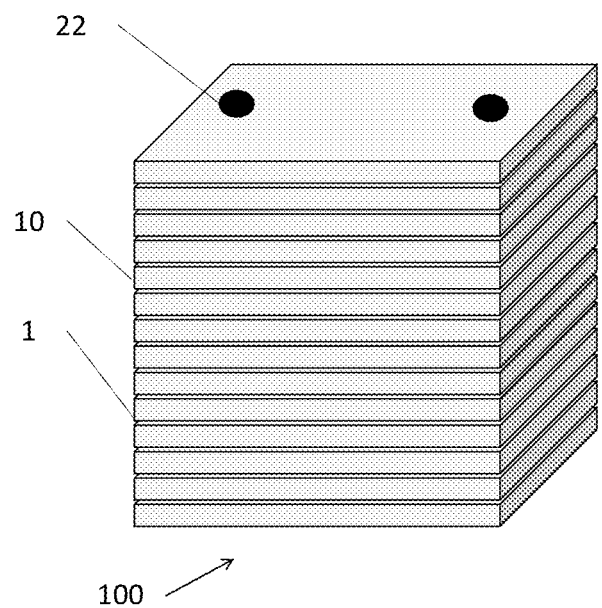
FIG. 1A is a perspective view of a solid oxide electrolyzer cell (SOEC) stack.
Figure 1B:
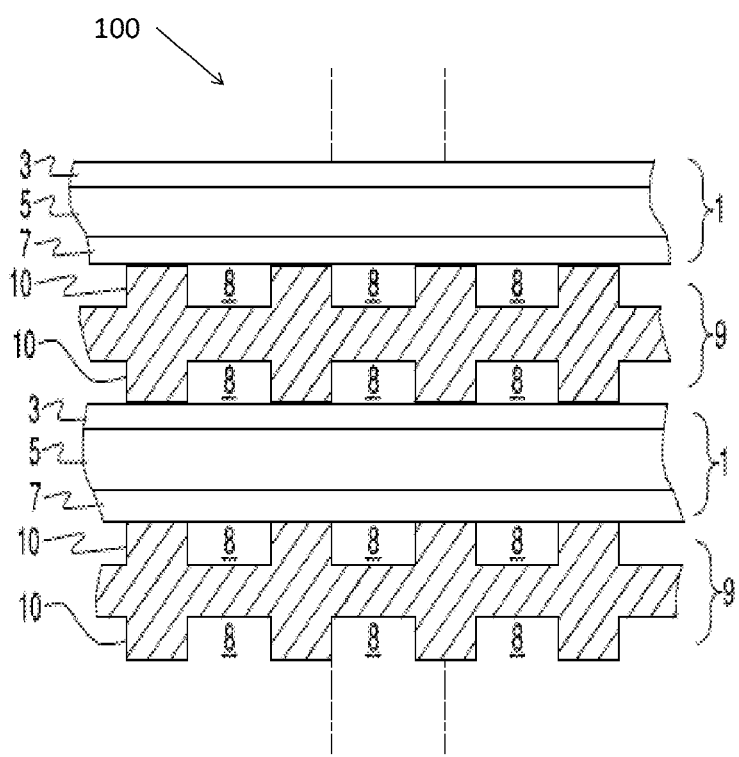
FIG. 1B is a side cross-sectional view of a portion of the stack of FIG. 1A.

FIG. 1A is a perspective view of a solid oxide electrolyzer cell (SOEC) stack 100, and FIG. 1B is a side cross-sectional view of a portion of the stack 000 of FIG. 1A. Referring to FIGS. 1A and 1B, the stack 100 includes multiple electrolyzer cells 1 that are separated by interconnects 10, which may also be referred to as gas flow separator plates or bipolar plates. Each electrolyzer cell 1 includes an air electrode 3, a solid oxide electrolyte 5, and a fuel electrode 7. The stack 100 also includes internal fuel riser channels 22.

Each interconnect 10 electrically connects adjacent electrolyzer cells 1 in the stack 20. In particular, an interconnect 10 may electrically connect the fuel electrode 7 of one electrolyzer cell 1 to the air electrode 3 of an adjacent electrolyzer cell 1. FIG. 1B shows that the lower electrolyzer cell 1 is located between two interconnects 10.

Each interconnect 10 includes ribs 12 that at least partially define fuel channels 8A and air channels 8B. The interconnect 10 may operate as a gas-fuel separator that separates the fuel/steam side of one fuel cell from the air side of an adjacent fuel cell, flowing to the fuel electrode 7 of one electrolyzer cell 1 in the stack 20 from air, flowing to the air electrode 3 of an adjacent electrolyzer cell 1 in the stack 20. The optional air flow serves as a sweep gas to entrain the O2 transported by electrolysys. At either end of the stack 100, there may be an air end plate or fuel end plate (not shown) for providing air or fuel, respectively, to the end electrode.

Figure 2A:
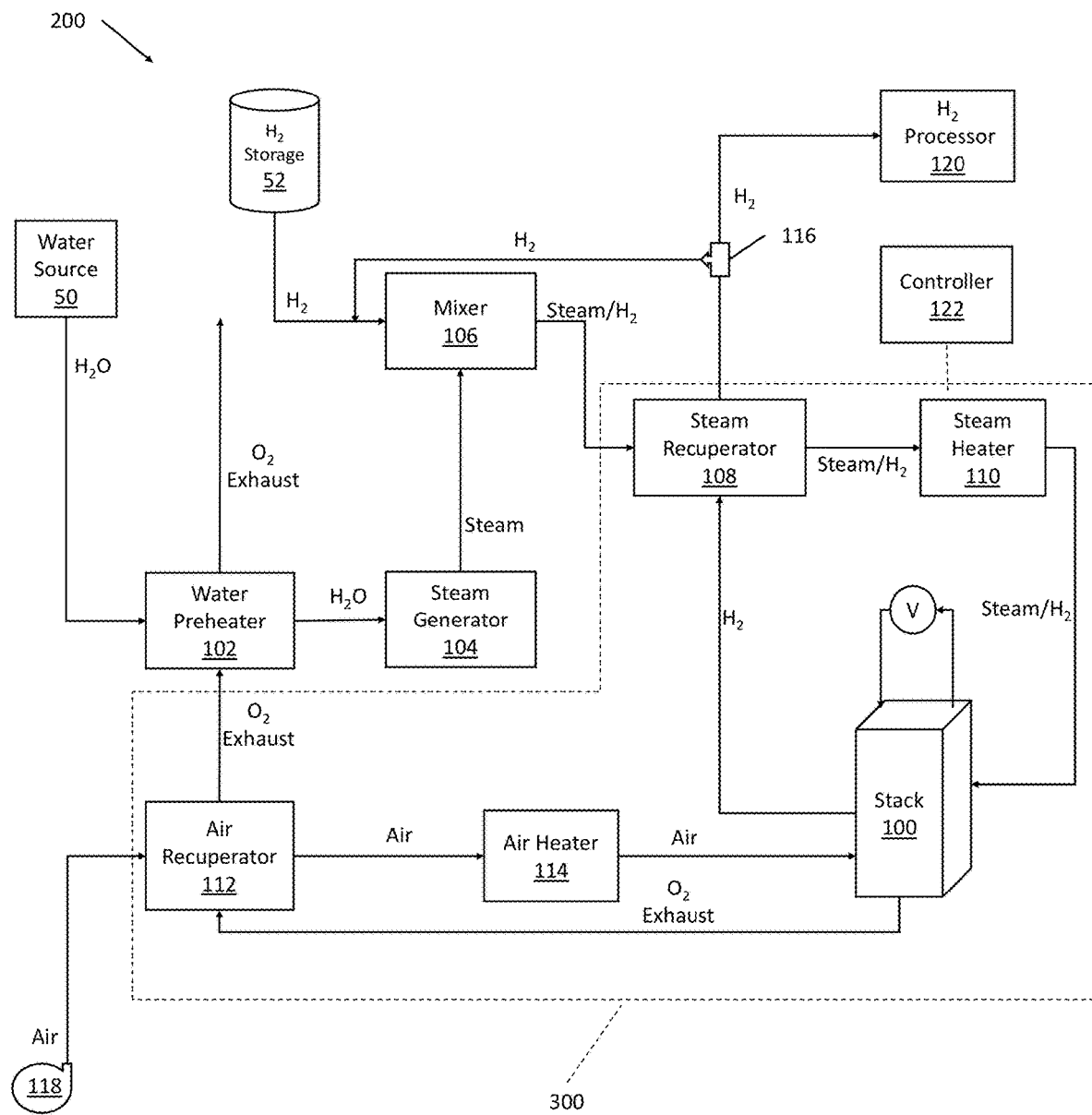
FIGS. 2A and 2B are schematic views of process flow diagrams showing process flows through an electrolyzer system according to various embodiments of the present disclosure.
Figure 2B:
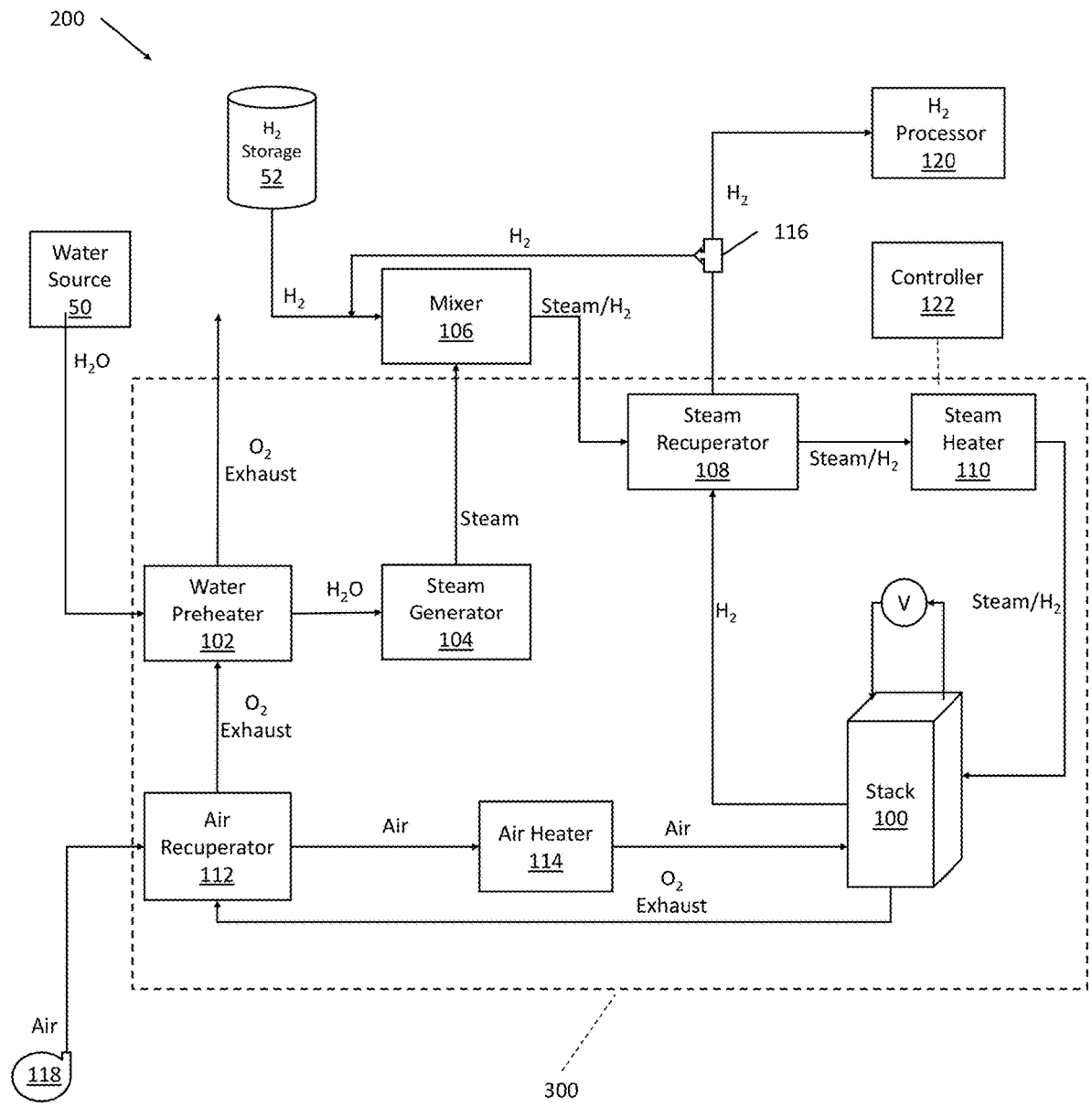

FIGS. 2A and 2B are schematic views showing a process flows in an electrolyzer system 200, according to various embodiments of the present disclosure. Referring to FIGS. 1A, 1B, 2A and 2B, the system 200 may include an electrolyzer cell (SOEC) stack 100 including multiple solid oxide electrolyzer cells (SOECs), as described with respect to FIGS. 1A and 1B. The system 200 may also include a steam generator 104, a steam recuperator 108, a steam heater 110, an air recuperator 112, and an air heater 114. The system 200 may also include an optional water preheater 102 and an optional mixer 106.

The system 200 may include a hotbox 300 to house various components, such as the stack 100, steam recuperator 108, steam heater 110, air recuperator 112, and/or air heater 114. In some embodiments, the hotbox 300 may include multiple stacks 100. The water preheater 102 and the steam generator 104 may be located external to the hot box 300 as shown in FIGS. 2A and 2B. Alternatively, the water preheater 102 and/or the steam generator 104 may be located inside the hot box 300. In another alternative, the water preheater 102 may be located inside the hot box 300 and the steam generator 104 may be located outside the hot box 300 (not shown). As will be readily understood, other configurations are feasible without departing from the invention.

During operation, the stack 100 may be provided with steam and electric current or voltage from an external power source. In particular, the steam may be provided to the fuel electrodes 7 of the electrolyzer cells 1 of the stack 100, and the power source may apply a voltage between the fuel electrodes 7 and the air electrodes 3, in order to electrochemically split water molecules and generate hydrogen (e.g., $H_2$) and oxygen (e.g., $O_2$). Air may also be provided to the air electrodes 3, in order to sweep the oxygen from the air electrodes 3. As such, the stack 100 may output a hydrogen stream and an oxygen-rich exhaust stream, such as an oxygen-rich air stream ("oxygen exhaust stream").

In order to generate the steam, water may be provided to the system 200 from a water source 50. The water may be deionized (DI) water that is deionized as much as is practical (e.g., <0.1 μS/cm), in order to prevent and/or minimize scaling during vaporization. In some embodiments, the water source 50 may include deionization beds. In various embodiments, the system 200 may include a water flow control device (not shown) such as a mass flow controller, a positive displacement pump, a control valve/water flow meter, or the like, in order to provide a desired water flow rate to the system 200.

If the system 200 includes the water preheater 102, the water may be provided from the water source 50 to the water preheater 102. The water preheater 102 may be a heat exchanger configured to heat the water using heat recovered from the oxygen exhaust stream. Preheating the water may reduce the total power consumption of the system 200 per unit of hydrogen generated. In particular, the water preheater 102 may recover heat from the oxygen exhaust stream that may not be recoverable by the air recuperator 112, as discussed below. The oxygen exhaust stream may be output from the water preheater 102 at a temperature above 80° C., such as above 100° C., such as a temperature of about 110° C. to 120° C.

The water output from the water preheater 102 or the water source 50 may be provided to the steam generator 104. A portion of the water may vaporize in the water preheater. The steam generator 104 may be configured to heat the water not vaporized in the water preheater to convert the water into steam. For example, the steam generator 104 may include a heating element to vaporize the water and generate steam. For example, the steam generator 104 may include an AC or DC resistance heating element, or an induction heating element.

The steam generator 104 may include multiple zones/elements that may or may not be mechanically separate. For example, the steam generator 104 may include a pre-boiler to heat the water up to, or near to the boiling point. The steam generator 104 may also include a vaporizer configured to convert the pre-boiled water into steam. The steam generator 104 may also include a deaerator to provide a relatively small purge of steam to remove dissolved air from the water prior to bulk vaporization. The steam generator 104 may also include an optional superheater configured to further increase the temperature of the steam generated in the vaporizer. The steam generator 104 may include a device such as a demister pad located downstream of the heating element and/or upstream from the super heater. The demister pad may be configured to minimize entrainment of liquid water in the steam output from the steam generator 104 and/or provided to the superheater.

If the steam product is superheated, it will be less likely to condense downstream from the steam generator 104 due to heat loss to ambient conditions. Avoidance of condensation is preferable, as condensed water is more likely to form slugs of water that may cause significant variation of the delivered mass flow rate with respect to time. It may also be beneficial to avoid excess superheating, in order to limit the total power consumption of the system 200. For example, the steam may be superheated by an amount ranging from about 10° C. to about 100° C.

Blowdown from the steam generator 104 may be beneficial for long term operation, as the water will likely contain some amount of mineralization after deionization. Typical liquid blowdown may be on the order of 1%. The blowdown may be continuous, or may be intermittent, e.g. 10× the steady state flow for 6 seconds out of every minute, 5× the steady state flow for 1 minute out of every 5 minutes, etc. The need for a water discharge stream can be eliminated by pumping the blowdown into the hot oxygen exhaust.

The steam output from the steam generator 104 may be provided to the steam recuperator 108. However, if the system 200 includes the optional mixer 106, the steam may be provided to the mixer 106 prior to being provided to the steam recuperator 108. In particular, the steam may include small amounts of dissolved air and/or oxygen. As such, the mixer 106 may be configured to mix the steam with hydrogen gas, in order to maintain a reducing environment in the stack 100, and in particular, at the fuel electrodes 7.

The mixer 106 may be configured to mix the steam with hydrogen received from a hydrogen storage device 52 and/or with a portion of the hydrogen stream output from the stack 100. The hydrogen addition rate may be set to provide an amount of hydrogen that exceeds an amount of hydrogen needed to react with an amount of oxygen dissolved in the steam. The hydrogen addition rate may either be fixed or set to a constant water to hydrogen ratio. However, if the steam is formed using water that is fully deaerated, the mixer 106 and/or hydrogen addition may optionally be omitted.

In some embodiments, the hydrogen may be provided by the external hydrogen source during system startup and/or during steady-state operations. For example, during startup, the hydrogen may be provided from the hydrogen storage device, and during steady-state, the hydrogen may be provided from the hydrogen storage device 52 and/or by diverting a portion of the hydrogen stream (i.e., hydrogen exhaust stream) generated by the stack 100 to the mixer 106. In particular, the system 200 may include a hydrogen separator 116, such as a splitter, pump, blower and/or valve, configured to selectively divert a portion of the generated hydrogen stream to the mixer 106, during steady-state operation.

The steam recuperator 108 may be a heat exchanger configured to recover heat from the hydrogen stream output from the stack 100. As such, the steam recuperator 108 may be configured to increase the efficiency of the system 200. The steam may be heated to a range between 600° C. to 830° C. in the steam recuperator 108. In some instances, the steam is heated to within 10° C. to 150° C. of the stack operating temperature. For example, the stack operating temperature may be 700° C. or 750° C., or there between, and the steam may be heated to at least 700° C., such as 720° C. to 780° C. in the steam recuperator 108.

The steam output from the steam recuperator 108 may be provided to the steam heater 110 which is located downstream from the steam recuperator 108, as shown in FIG. 2A. The steam heater 110 may include a heating element, such as a resistive or inductive heating element. The steam heater 110 may be configured to heat the steam to a temperature above the operating temperature of the stack 100. For example, depending on the health of the stack 100, the water utilization rate of the stack 100, and the air flow rate to the stack 100, the steam heater 110 may heat the steam to a temperature ranging from about 900° C. to about 1200° C., such as 920° C. to 980° C. With the lower stack temperature between 700° C. and 750° C., the steam heater outlet temperature may be as low as 700° C. Accordingly, the stack 100 may be provided with steam or a steam-hydrogen mixture at a temperature that allows for efficient hydrogen generation. Heat may also be transported directly from the steam heater to the stack by radiation (i.e., by radiant heat transfer). In some embodiments, steam heater 110 is optional, and heat obtained through air heater 114.

In one alterative embodiment shown in FIG. 2B, the steam recuperator 108 may be located downstream from the steam heater 110 such that steam existing the steam heater 110 enters the steam recuperator 108 instead of vice-versa. In another alternate embodiment, the steam heater 110 may include a heat exchanger configured to heat the steam using heat extracted from a high-temperature fluid, such as a fluid heated to about 1200° C. or more. This fluid may be provided from a solar concentrator farm or a power plant, such as a nuclear reactor power plant, for example. Alternatively, if the fluid is a high temperature steam, such as steam provided from a nuclear reactor power plant, then such steam may be provided to the fuel electrodes 7 of the stack 100. In this case, the water source 50 may comprise a source of high temperature steam, and one or more of the water preheater 102, steam generator 104, steam recuperator 108 and/or steam heater 110 may be omitted.

In some embodiments, the steam heater 110 may include multiple steam heater zones with independent power levels (divided vertically or circumferentially or both), in order to enhance thermal uniformity, in some embodiments.

In some embodiments, the operations of the steam recuperator 108 and the steam heater 110 may be combined into a single component. For example, the steam recuperator 108 may include a voltage source configured to apply a voltage to heat exchange fins of the steam recuperator 108, such that the heat exchange fins operate as resistive heating elements and heat the steam to a temperature high enough to be provided to the stack 100, such as a temperature ranging from about 900° C. to about 1200° C. The high temperature steam (or optionally a steam/hydrogen mixture) output from the steam heater 110 may be provided to the fuel electrodes 7 of the stack 100.

The oxygen exhaust output from the stack 100 may be provided to the air recuperator 112. The air recuperator 112 may be provided with ambient air by an air blower 118. The air recuperator 112 may be configured to heat the air using heat extracted from the oxygen exhaust. In some embodiments, the ambient air may be filtered to remove contaminants, prior to being provided to the air recuperator 112 or the air blower 118.

Air output from the air recuperator 112 may be provided to the air heater 114. The air heater may include a resistive or inductive heating element configured to heat the air to a temperature exceeding the operating temperature of the stack 100. For example, depending on the health of the stack 100, the water utilization rate of the stack 100, and the air flow rate to the stack 100, the air heater 114 may heat the air to a temperature ranging from about 900° C. to about 1200° C., such as 920° C. to 980° C. With lower stack temperatures, the air heater temperature could be as low as 800° C. Accordingly, the stack 100 may be provided with air at a temperature that allows for efficient hydrogen generation. Heat may also be transported directly from the air heater to the stack by radiation.

The higher the temperature output from the air recuperator, the less power is required for the air heater 114. Increased pressure drop on either side of the air recuperator 112 may be counteracted with increased air blower 118 power. Increased pressure drop may aid the circumferential mass flow uniformity, creating a more uniform heat transfer environment, and higher temperature for the air inlet stream output from the air recuperator 112. Increased pressure drop may also increase the local heat transfer coefficient, thereby increasing the average outlet temperature from the air recuperator 112.

In alternative embodiments, the air heater 114 may include a heat exchanger configured to heat the air using heat extracted from a high-temperature fluid, such as a fluid heated to about 1200° C., or more. This fluid may be provided from a solar concentrator farm or a nuclear reactor, for example.

The air heater 114 may include multiple air heater zones with independent power levels (divided vertically or circumferentially or both), in order to enhance thermal uniformity, in some embodiments. In some embodiments, the air heater 114 may be disposed below the air recuperator 112, or between the stack 100 and the steam recuperator 108 or both. The air heater 114 may include baffles having slits of different sizes at different heights along the baffles, to allow air to exit the air heater 114 approximately evenly in both temperature and height, at all heights along the air heater 114. Air from the air heater 114 is provided to the air electrodes 3 of the stack 100.

In some embodiments, the air recuperator 112 and the air heater 114 may be combined into a single component. For example, the air recuperator 112 may include a voltage source configured to apply a voltage to heat exchange fins of a heat exchanger included in the air recuperator 112 combined component, such that the fins operate as resistive heating elements and heat the air to a temperature high enough to be provided to the stack 100, such as a temperature ranging from about 900° C. to about 1200° C.

According to various embodiments, the system 200 may include an optional air preheater disposed outside of the hotbox 300. In particular, the air preheater may be configured to preheat air provided to the hotbox 300 by the air blower 118. The primary purpose of the air preheater is as a cathode product cooler. It cools the product H2/residual steam to a lower temperature to lower overall power consumption and to reduce the temperature below the maximum temperature of the steam recycle blower (e.g. 180° C., or 200° C.).

In some embodiments, the system 200 may be operated in a thermal neutral configuration, where each electrolyzer cell 1 in the stack 100 is provided with a thermal-neutral voltage. In particular, the current provided to each electrolyzer cell 1 may be varied such that the heat generated by $I^2R$ heating balances the (endothermic) heat of reaction. As such, use of the steam heater 110 and/or the air heater 114 may be minimized or eliminated during steady-state thermal neutral operation.

The hydrogen stream output from the steam recuperator 108 and the optional hydrogen separator 116 at a temperature of 120° C. to 150° C. may be compressed and/or purified in a hydrogen processor 120, which may include a high temperature hydrogen pump that operates at a temperature of from about 120° C. to about 150° C., in order to remove from about 70% to about 90% of the hydrogen from the hydrogen stream. A remaining unpumped effluent from the hydrogen pump is water rich stream that was already fully vaporized. This water rich stream may be fed to a blower for recycle into the mixer 106 or stream recuperator 108, eliminating the need for water vaporization in the steam generator 104.

Steam loss into the hydrogen stream may be minimized by increasing the hydrogen pump pressure to a pressure ranging from about 3-50 (e.g., 20) pounds per square inch gage (psig), for example. This separation may be at the electrolyzer module level (e.g., single hot box), system level (grouping of hotboxes (e.g., grouping of 3 or 4) that operate under a unified control system, stamp level (larger grouping that share some joint components (e.g., water sources), or site level (all at given site).

Water condensation and compression of the hydrogen stream may consume a significant amount of power. In some embodiments, air flow to the stack 100 may be reduced or stopped, such that the stack 100 outputs pure or nearly pure oxygen gas as stack exhaust. In addition, the air and fuel sides of the electrolyzer cells 1 may be operated at an equal pressure ranging from about 3 psig to about 50 psig. In some embodiments, air provided to the stack 100 may be provided at a very minimal flow to avoid significant power consumption by an upstream air compressor.

High pressure operation may allow for the elimination of the power and equipment associated with the first stage of the hydrogen stream compression, may reduce the size of the initial condenser stage, due to the higher dew point due to the higher pressure, and/or may reduce the physical space required for flow channels, due to the higher density associated with higher pressure.

According to various embodiments, the system 200 may include a controller 122, such as a central processing unit, that is configured to control the operation of the system 200. For example, the controller 122 may be wired or wirelessly connected to various elements of the system 200 to control the same.

In some embodiments, the controller 122 may be configured to control the system 200, such that the system 200 may be operated in a standby mode where no hydrogen stream is generated. During the standby mode, electrical heaters associated with (i.e., located in a heat transfer relationship with) the stack 100 may be run at the minimum power level needed to keep the electrolyzer cells 1 at a desired standby temperature. The desired standby temperature may be different from the desired production operating temperature, and may be impacted by an acceptable time needed to return to a desired operating temperature.

Recovery from standby mode to steady-state operation may allow for hydrogen generation to be initiated at a lower temperature than the standard steady-state operating temperature. At the lower temperature, cell resistance may be higher, which may provide additional heating to increase the stack 100 to the steady-state operating temperature once the system starts to recover from hot standby. Water/steam feed during hot standby can be significantly reduced or eliminated. Hydrogen addition to the steam in the mixer 106 may also be significantly reduced or eliminated.

In some embodiments, during hot standby, the hydrogen separator 116 may be used to divert the hydrogen stream, such that hydrogen may be fed to displace most or all of the steam in the system 200. The separator (e.g., valve) 116 may then closed to maintain a reducing atmosphere in the stack 100, without any additional hydrogen consumption. Air flow to the stack 100 may be significantly reduced or eliminated. In some embodiments, there may be a minimum air flow to keep the air heater 114 from overheating.

The system 200 may include a hydrogen processor 120 configured to process the hydrogen stream. For example, the hydrogen processor 120 may be configured to compress the hydrogen stream to a desired pressure, such as about 500 to about 8000 psig. Compression may include multiple stages, with optional inter-stage cooling and water removal.

During hot standby, Steam heater 110 may be run at the minimum power level to keep it from overheating with no water/steam feed. The hydrogen stream (i.e., hydrogen exhaust stream) from the stack 100 may be a warm stream containing hydrogen gas and water. The desired product may be high pressure (e.g., about 500 to about 8000 psig) purified, hydrogen. The hydrogen streams of multiple stacks 100 on site may be combined into a single stream. This combined stream may be cooled as much as practical using, for example, air coolers or heat exchangers cooled by a site cooling water tower, which may be part of the hydrogen processor 120. The hydrogen output from the hydrogen processor 120 may be provided for storage or use, such as to be used as a fuel in a fuel cell power generation system.

In various embodiments, the hydrogen processor 120 may include at least one electrochemical hydrogen pump, liquid ring compressor, diaphragm compressor, or other compression device or combination thereof. For example, the hydrogen processor may include a series of electrochemical hydrogen pumps, which may be disposed in series and/or in parallel with respect to a flow direction of the hydrogen stream, in order to compress the hydrogen stream. Electrochemical compression may be more electrically efficient than traditional compression. The final product from compression may still contain traces of water. As such, the hydrogen processor 120 may include a dewatering device, such as a temperature swing adsorption reactor or a pressure swing adsorption reactor, to remove this residual water, if necessary. The system may be configured to repurify (e.g., in DI beds) the residual water and provide the residual water removed from the compressed hydrogen stream to the water preheater The product may also contain some trace nitrogen gas, which may be dissolved air in the water. Electrochemical compression may inherently remove the trace nitrogen.

In some embodiments, condensed water may be recycled to the feed of the process (feed to the DI beds) in the water source 50. Hydrogen added to the steam in the mixer 106 may be produced during the first stage or any intermediate stage of the compression train, and may be dehumidified if necessary. The hydrogen storage device 52 may include a low/intermediate pressure storage tank for the hydrogen provided through the mixer 106 to the stack 100.

According to various embodiments, the controller 122 may be configured to control the operation of the system 200 based on various site-wide control parameters. For example, the controller 122 may be configured to control hydrogen production based on any of: the operational limits of each SOEC stack; power availability; instantaneous average power costs, including the impact of demand charges at all tiers; instantaneous marginal power costs, including the impact of demand charges at all tiers; instantaneous power renewable content; available hydrogen storage capacity; stored energy available for use (e.g., either thermal storage or electrical storage); a hydrogen production plan (e.g., a daily, weekly, or month plan, etc.); hydrogen production revenue implications (e.g., sales price, adjustments for production levels, penalties for nonperformance, etc.); a maintenance plan; the relative health of all hot boxes on site; the compression/condensation train mechanical status; the water/steam/hydrogen feed availability; the weather conditions and/or forecast; any other known external constraints, either instantaneous, or over some production plan period (e.g., only allowed so much water per month, or so many MW-hr per month); and/or the minimum acceptable time to start producing hydrogen from standby mode (if standby is predicted to last multiple hours, it may be desirable to allow the cells to cool below operating temperature).

Figure 3:
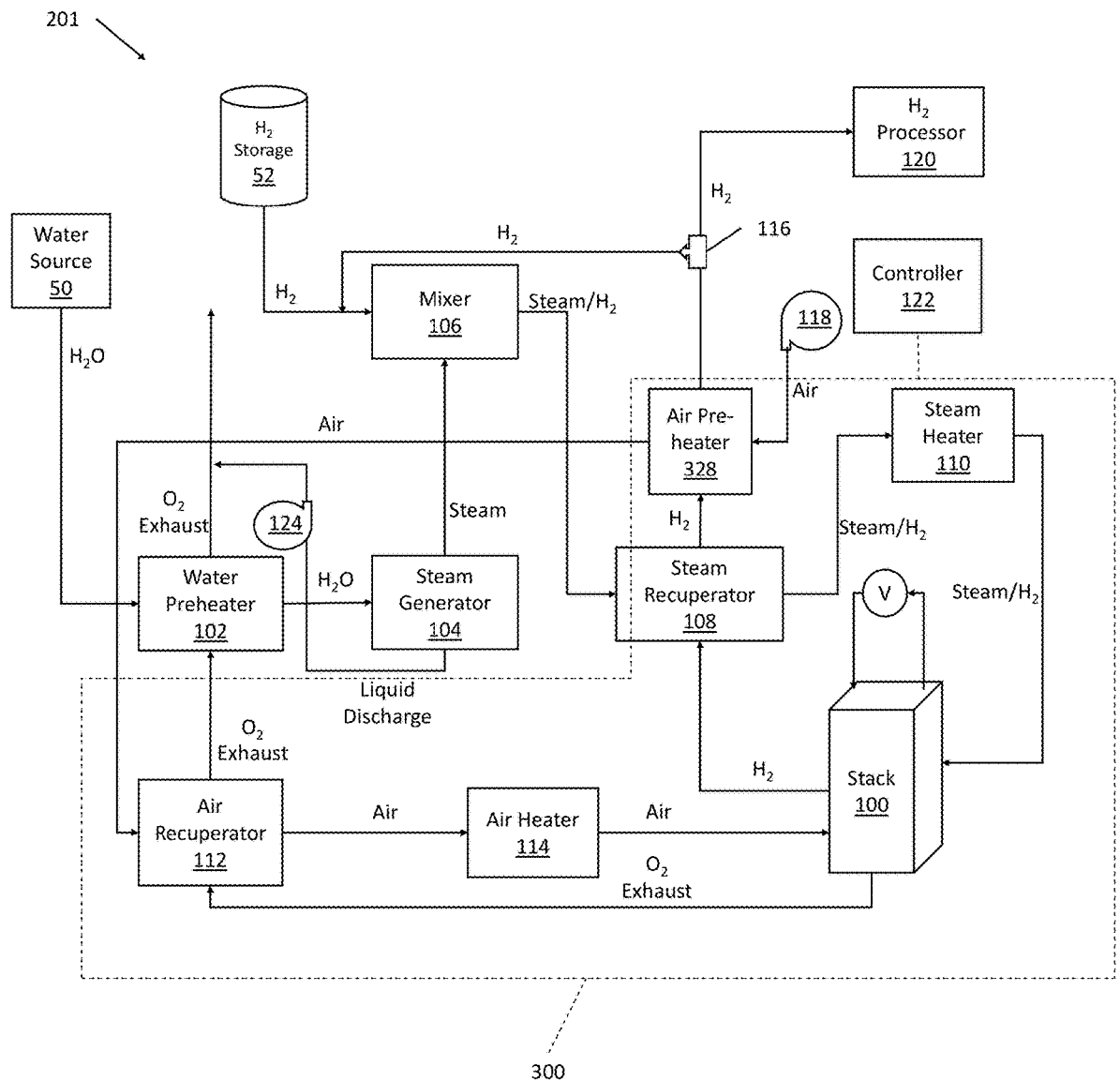
FIG. 3 is a schematic view showing a process flow in an alternative electrolyzer system 201, according to various embodiments of the present disclosure.

FIG. 3 is a schematic view showing a process flow in an alternative electrolyzer system 201, according to various embodiments of the present disclosure. The electrolyzer system 201 may be similar to the electrolyzer system 200, so only the differences there between will be discussed in detail.

Referring to FIG. 3, the electrolyzer system 201 may include an optional air preheater 328 disposed inside of the hotbox 300. Alternatively, the optional air preheater 328 may be disposed outside of the hotbox 300. The air preheater 328 may be a heat exchanger configured to preheat air provided from the air blower 118, using heat extracted from the hydrogen stream output from the steam recuperator 108. The preheated air may then be provided to the air recuperator 112. In this embodiment, additional electricity or an additional gas heater is not required to provide heat to the air preheater 328. The optional air preheater 328 may provide that the hydrogen/steam stream to the hydrogen separator 116 is substantially cooler, allowing the hydrogen separator to be made of cheaper materials.

In some embodiments, a small amount of liquid water (e.g., from about 0.5% to about 2% of incoming water) may be periodically or continuously discharged from the steam generator 104. In particular, the discharged liquid water may include scale and/or other mineral impurities that may accumulate in the steam generator 104 while vaporizing water to generate steam. Therefore, this discharged liquid water is not desirable for being recycled into the water inlet stream from the water source 50. This liquid discharge may be mixed with the hot oxygen exhaust stream output from the water preheater 102 into an exhaust conduit. The hot oxygen exhaust stream may have a temperature above 100° C., such as 110 to 130° C., for example 120° C. As such, the liquid water discharge may be evaporated by the hot oxygen exhaust stream, such that no liquid water is required to be discharged from the system 201. The system 201 may optionally include a pump 124 configured to pump and regulate the liquid water discharge output from the steam generator 104 into the oxygen exhaust output from the water preheater 102. Optionally, a proportional solenoid valve may be added in addition to the pump 124 to additionally regulate the flow of the liquid water discharge.

One or more exhausts of respective power modules may be combined into a single exhaust header to evaporate the water, or control the condensed water sent to each power module. For example, each exhaust may be configured proportional to exhaust flow of each power module. Here, one or more control valves may be used to control the percent exhaust flow for each power module. In another example, similar post evaporation temperatures may be used for each power module. Here, the outlet temperature of each power module is monitored and respective control valves disperse the flow of the condensate. In yet another example, similar liquid water mass flows may be set to flow through an orifice to each power module. Here, a solenoid valve may be used to adjust (e.g., open or close) flow to a power module that is not in a condition to accept the condensate.

FIG. 4A is a perspective view of a hotbox 300, according to various embodiments of the present disclosure, and FIG. 4B is a perspective view of the hotbox 300, with its outer shell removed. Referring to FIGS. 4A and 4B, the hotbox 300 may include an outer shell 302 and an inner shell 304 that are disposed over a base plate 306. The inner shell 304 may include an upper inner shell 304A and a lower inner shell 304B.

A cover plate 310 may be disposed above the outer shell 302 and the inner shell 304. The base plate 306 may be disposed on a support frame 308. The support frame 308 may comprise hollow rails which provide access for a forklift to raise and move the hotbox 300. A water inlet conduit 312, a preheated water outlet conduit 314, and air (e.g., oxygen enriched air) outlet conduits 316 may extend through the cover plate 310. A central column 320 may also extend through the cover plate 310. An air inlet conduit 322, a preheated water (e.g., steam) inlet conduit 324, and a hydrogen outlet conduit 326 may be disposed on the central column 320.

The above described air recuperator 112 may be disposed in an upper portion of the hotbox 300 and the above described air heater 114 may be disposed in a lower portion of the hotbox 300. In particular, the outer shell 302 and the upper inner shell 304A may form at least a portion of the air recuperator 112. The air heater 114 may include one or more peripheral heating elements 214 disposed between the lower inner shell 304B and the outer shell 302. The peripheral heating elements 214 may include resistive heating elements which are powered by an external current or voltage. The peripheral heating elements 214 may extend laterally in a serpentine pattern. However, any suitable coil pattern or configuration may be used. The peripheral heating elements 214 may be held in position by support elements 220. The support elements 220 may be configured to maintain a spacing between the inner shell 304 and the outer shell 302. In some embodiments, the support elements 220 may comprise brackets formed of a dielectric material that can withstand high temperatures, such as a ceramic material.

FIG. 5A is a cross-sectional view of the hotbox 300 of FIGS. 4A and 4B, according to various embodiments of the present disclosure, FIG. 5B a cross-sectional view of the hotbox 300, showing components disposed inside of the central column 320, FIG. 5C is a partial perspective view showing elements of a steam recuperator 108 and/or air recuperator 112 of the hotbox 300, and FIG. 5D is a perspective view showing a distribution hub 340 of the hotbox 300.

Referring to FIGS. 5A and 5B, the hot box 300 may include electrolyzer cell stacks 100 arranged in plural columns around the central column 320. The air recuperator 112 may surround an upper portion of the stacks 100. The air recuperator 112 may include an outer chamber 112C1 and an inner chamber 112C2, separated by a separation plate (not shown).

The air heater 114 may include the peripheral heating elements 214, and may optionally include one or more central heating elements 216 and one or more bottom heating elements 218. The heating elements 214, 216, 218 may be electrical resistive elements, such as AC or DC heating coils, or inductive heating elements, for example. The peripheral heating element 214 may surround bottom portions of the stacks 110. The central heating elements 216 may surround the central column 320 and may be surrounded by the stacks 100. The central heating elements 216 may operate to maintain the temperature of the central column 320. The bottom heating elements 218 may be disposed below the stacks 100.

In various embodiments, the peripheral heating elements 214 may be covered by an insulation layer 318. For example, the peripheral heating elements 214 may be disposed in a space between the lower inner shell 304B and the insulation layer 318, or within the insulation layer 318.

The water preheater 102 may be disposed above the stacks 100. In particular, the water preheater 102 may include coiled water pipes 103 disposed on the cover plate 310. The inlet of the coiled water pipes 103 is fluidly connected to the water inlet conduit 312. The outlet of the coiled water pipes 103 is fluidly connected to the preheated water outlet conduit 314. The preheated water outlet conduit 314 may be fluidly connected to the preheated water inlet conduit 324 in the central water column by extending up and then inward from the coiled water pipes 103. The air outlet conduits 316 may be disposed over the water preheater 102, such that oxygen (i.e., oxygen enriched air) exhaust flows past the coiled water pipes 103 of the water preheater 102, before exiting the hotbox 300.

The steam generator 104 may be located within an upper portion of the central column 320. The steam heater 110 may be may be located within a lower portion of the central column 320. In particular, the steam heater 110 may be fluidly connected to the steam generator by a connection conduit 330.

The steam generator 104 may include a vaporizing manifold 104M and at least one heating element 104E disposed within or adjacent to the vaporizing manifold 104M. The vaporizing manifold 104M may connect the preheated water inlet conduit 324 to the connection conduit 330. The heating element 104E may be configured to generate steam by vaporizing water flowing in conduits of the vaporizing manifold 104M. In some embodiments, the vaporizing manifold 104M may include conduits that are disposed outside and inside of the heating element 104E, such that heat may be extracted from inside and outside of the heating element 104E and used to vaporize the water flowing through the vaporizing manifold 104M.

Referring to FIG. 5B, the steam heater 110 may include a housing 110H in which at least one heating element 110E and a steam manifold 110M are disposed. The steam manifold 110M may surround the heating element 110E and may be fluidly connected to the connection conduit 330. In some embodiments, the steam heater 110 may be configured to super heat steam generated by the steam generator 104. In some embodiments, the steam manifold 110M may include conduits that are disposed outside and inside of the heating element 110E, such that heat may be extracted from inside and outside of the heating element 110E and used to superheat the steam flowing through the steam manifold 110M.

The heating elements 104E, 110E may be electrical heating elements as described above. In some embodiments, the heating elements 104E, 110E may be heating coils. In some embodiments, the heating elements 104E, 110E may be physically isolated from the water and/or steam flowing thereby, so as not to directly contact water and/or steam.

The steam recuperator 108 may be disposed in the central column 320, surrounding the steam heater 110. The steam recuperator 108 is located upstream from the steam heater 110, as shown in FIG. 2A.

In some embodiments, an optional air preheater heat exchanger 328 may be disposed in the central column 320, surrounding the steam generator 104. The air preheater heat exchanger 328 contains at least one air inlet conduit and at least one hydrogen outlet conduit such that the hydrogen outlet stream pre-heats the air inlet stream.

As shown in FIG. 5C, the steam recuperator 108 and/or the air recuperator 112 may respectively include separation plates 108P, 112P. In some embodiments, the separation plates 108P, 112P may be corrugated. The separation plate 108P may be configured to divide the steam recuperator 108 into an outer chamber 108C1 and an inner chamber 108C2. The separation plate 112P may be configured to divide the air recuperator 112 into an outer chamber 112C1 and an inner chamber 112C2. In various embodiments, the air preheater 328 may have a similar configuration, with the outer and inner chambers separated by a corrugated separation plate 328P shown in FIG. 5A.

The outer chamber 108C1 of the steam recuperator 108 may be configured to receive hydrogen output from the stacks 100, and the inner chamber 108C2 may be configured to receive steam from the steam heater 110. However, in other embodiments, outer chamber 108C1 may receive steam and the inner chamber 108C2 may receive hydrogen.

The outer chamber 112C1 of the air recuperator 112 may be configured to receive air from the central column 320, and the inner chamber 112C2 may be configured receive oxygen exhaust from the stacks 100. However, in other embodiments, outer chamber 112C1 may receive oxygen exhaust and the inner chamber 112C2 may receive air.

As shown in FIG. 5D, the central column 320 may be disposed on a distribution hub 340. The distribution hub 340 may be configured to fluidly connect the central column 320 to the stacks 100 disposed thereon. While only two stacks 100 are shown in FIG. 5D, the distribution hub 340 may be fluidly connected to all the stacks included in the hotbox 300. The distribution hub 340 may include steam distribution conduits 340S and hydrogen collection conduits 340H. The steam distribution conduits 340S may be configured to distribute steam from the central column 320 to the stacks 100, and the hydrogen collection conduits 340H may be configured to provide hydrogen generated by the stacks 110 to the central column 320.

Referring to FIGS. 5A-5D, during operation, water may be provided to the hotbox 300 through the water inlet conduit 312. The water from the water inlet conduit 312 may then circulate through the coiled water pipes 103 of the water preheater 102, such that oxygen exhaust (i.e., oxygen rich air exhaust) flowing past the coiled water pipes 103 preheats the water flowing through the coiled water pipes 103. The preheated water may then be provided from the coiled water pipes 103 of the water preheater 102 surrounding the central column 320 to the preheated water inlet conduit 324 in the central column 320 through the preheated water outlet conduit 314.

The preheated water may then flow downward through the central column 320. In particular, the preheated water may flow from the preheated water inlet conduit 324 into the vaporizing manifold 104M of the water vaporizer 104. Heat generated by the heating element 104E may be used to vaporize the preheated water in the vaporizing manifold 104M, thereby generating steam.

The steam may be provided from the vaporizing manifold 104M to the steam heater 110, through the connection conduit 330. In particular, the steam may pass through the steam manifold 110M while being superheated by the heating element 110E. The steam may exit the steam manifold 110M at the bottom of the housing 110H. The steam may then flow up into the steam recuperator 108 which surrounds the steam heater.

The steam may flow down through the inner chamber 108C2 of the steam recuperator 108, before being provided to the distribution hub 340. The steam may flow through the steam distribution conduits 340S to each of the stacks 100 (e.g., to each column of the stacks 100). The steam may then be provided to the fuel (e.g., cathode) electrodes of the SOECs of the stacks 100. Hydrogen steams generated by the stacks 100 (e.g., at the fuel electrodes of the SOECs of the stacks 100) may be provided to the hydrogen collection conduits 340C, such that the distribution hub 340 provides a combined hydrogen stream to the central column 320. The hydrogen stream may include unreacted steam output from the stacks 100. The oxygen exhaust (i.e., oxygen rich air) stream may be provided from the air (i.e., anode) electrodes of the SOECs of the stacks 100 to the air recuperator 112 surrounding the stack 100 columns.

In some embodiments, the hotbox 300 may include riser conduits 332 (see also FIG. 11) that fluidly connect the stacks 100 to the steam distribution conduits 340S and the hydrogen collection conduits 340C. In particular, the riser conduits 332 may include steam conduits to provide the steam to the SOECs of each stack 100, and hydrogen conduits configured to collect hydrogen output by the SOECs of each stack 100. Thus, the stacks 100 may be internally manifolded for steam/hydrogen and externally manifolded for oxygen/air.

The distribution hub 340 may provide the hydrogen stream to the steam recuperator 108, where the hydrogen stream may flow up through the outer chamber 108C1. The hydrogen stream may heat steam flowing down through the inner chamber 108C2. The hydrogen stream may exit the steam recuperator 108 and flow up the central column 320 into the air preheater 328. In particular, the hydrogen stream may flow through a first chamber of the air preheater 328 to the hydrogen outlet conduit 326 while heating the air inlet stream flowing through the second chamber of the air preheater 328 which is separated from the first chamber by the plate 328P.

Air may be provided to the hotbox 300 through the air inlet conduit 322. The air may be provided to the first chamber of the air preheater 328, where the air may be preheated by the hydrogen stream in the second chamber. The heated air may flow from the air preheater 328, past the coils of the water preheater 102, and into the air recuperator 112.

In particular, the air may flow through the outer chamber 112C1 of the air recuperator 112, in a downward direction, to the air heater 114. The air may be heated while flowing down the hotbox 300 past the peripheral heating elements 214, across the bottom of the hotbox 300 past the optional bottom heating elements 218, and up the central column 320 past the central heating elements 216. The heated air may then exit the air heater 114 (e.g. through openings in top and/or side of the central heating elements 216) and flow to the stacks 110. The temperature of the air may be adjusted by adjusting the power applied to one or more of the heating elements 214, 216, 218. The air may be provided from the central plenum 320 radially outward to the air (i.e., anode) electrodes of the externally manifolded SOECs of the stacks 100. The air is combined at the air electrodes with the oxygen (i.e., oxide) ions diffusing through the SOEC electrolyte from the fuel (i.e., cathode) side of the SOECs. The mixture of the air and oxygen generated at the air electrodes of the SOECs may be provided from the air (i.e., anode) electrodes of the SOECs of the stacks 100 as the oxygen exhaust (i.e., oxygen rich air) stream radially outward from the stack 100 columns.

The oxygen exhaust may flow radially outward from the stacks 100 into the inner chamber 112C2 of the air recuperator 112. The air recuperator 112 may heat the air (i.e., the air inlet) stream in the outer chamber 112C1 using heat extracted from the oxygen exhaust stream in the inner chamber 112C2. The oxygen exhaust stream may then flow past the coiled water pipes 103 of the water preheater 102, and then exit the hotbox 300 via the air outlet conduits 316. The oxygen exhaust stream flowing through the water preheater 102 may also further preheat the air stream flowing through the shoulder manifold 334 fluidly connecting the air preheater 328 and the air recuperator 112 and extending adjacent to the water preheater 102.

FIG. 6 is a cross-sectional perspective view of a central column 320 including a modified steam generator 404, according to an alternative embodiment of the present disclosure. The steam generator 404 may be used instead of the steam generator 104 described above. Referring to FIG. 6, the steam generator 404 may be disposed inside of the central column 320. In particular, the steam generator 404 may be surrounded by the air preheater 328. The steam generator 404 may include a heating element 404E and a vaporization conduit 404C disposed inside of the heating element 404E. The heating element 404E may be a resistive heating element or coil, as described above. In this embodiment, the external preheated water outlet conduit 314 shown in FIGS. 5A and 5B may be replaced by an internal preheated water outlet conduit 314A which is located inside the central plenum 320.

In operation, preheated water may be provided from the water preheater 102 into the internal preheated water outlet conduit 314A which is located between the air preheater 328 and the vaporization conduit 404C. The water may flow up through the internal preheated water outlet conduit 314A before entering the vaporization conduit 404C through the preheated water inlet conduit 324.

A voltage applied to the heating element 404E results in resistive heating of the heating element 404E. The heat is then transferred the water in the vaporization conduit 404C, resulting in the generation of water vapor, e.g., steam. Over time, a small amount of scale may build up at the bottom of the steam generator 404, due to contaminants present in the water. Such scale may reduce heat transfer. As such, a small amount of preheated water may be drained from the bottom of the steam generator 404, in order remove the scale and/or other contaminants, as shown in FIG. 3.

FIG. 7A is a cross-sectional perspective view of a central column 320 and an external steam generator 504, according to another alternative embodiment of the present disclosure, and FIG. 7B is an enlarged partial cross-sectional view of the steam generator 504 of FIG. 7A. The steam generator 504 may be used instead of the steam generators 104, 404 described above. Referring to FIGS. 7A and 7B, the steam generator 504 may be disposed outside of the central column 320. In some embodiments, the steam generator 504 may be disposed outside of a hotbox 300 and/or mounted to the exterior of the hotbox. An outlet of the steam generator 504 may be fluidly connected to the central column 320 by an insulated steam conduit 408 which is surrounded by thermal insulation 409.

As shown in FIG. 7B, the steam generator 504 may include an internal heating surface 504H, such as a resistive heating element. An inlet 504I of the steam generator 504 may be fluidly connected to the water preheater 102 and the outlet 504O of the steam generator 504 may be fluidly connected to conduit 330 described above. The steam generator 504 may include helical baffle 504B located inside the outer tube 504T to define the steam flow path 504P.

As shown in FIG. 7C, the steam generator 504 may also include one or more drainage ports 504D through which condensed liquid may discharged from the steam generator 504, in order to prevent the accumulation of scale in the steam generator 504. The drainage port 504D may be fluidly connected to the air outlet conduit 316 (see FIGS. 3, 5A and 5B), such that the liquid discharge may be evaporated and carried away in the oxygen exhaust output from the hotbox. The drainage port 504D may include a valve 506 that may be opened to drain the water. The drainage port 504D may comprise the same conduit or a different conduit from the inlet 504I. The external location of the steam generator 504 reduces difficulties when routing wiring, drainage, and plumbing to the steam generator 504.

Figures 7D, 7E, 7F:
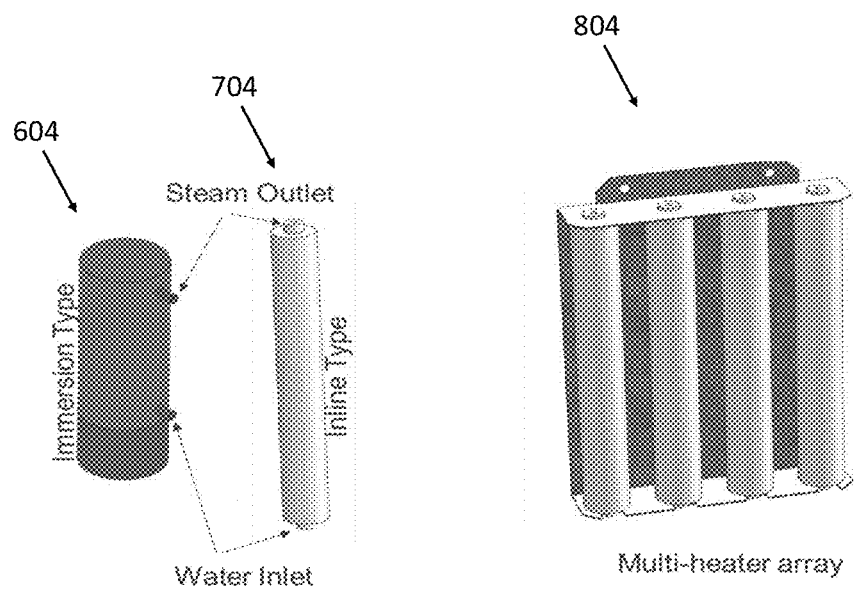

In alternative embodiments, the steam generator 104 may include an immersion-type steam generator 604, an inline steam generator 704, or a multi-heater steam generator array 804, as shown in FIGS. 7D, 7E and 7F, respectively. Alternatively a stand-alone steam generator may be used as a vaporizer to the SOEC hotbox 300.

Figure 8A:
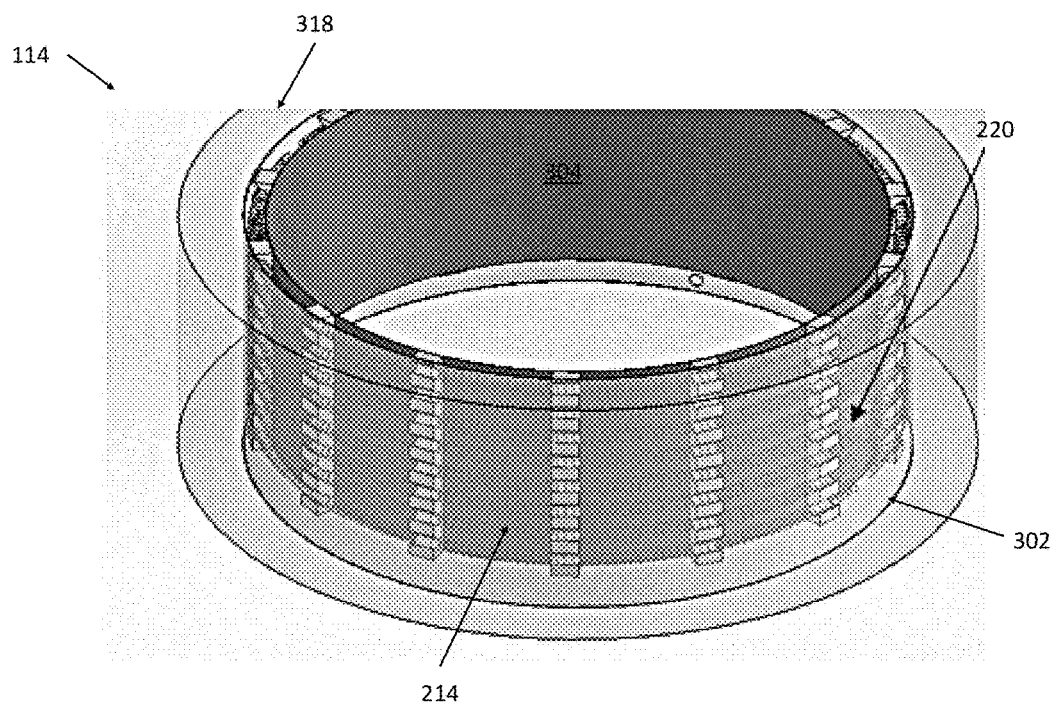

FIG. 8A is a partially transparent, perspective view of a portion of an air heater 114 that includes peripheral heating elements 214 having an alternative structure, according to various embodiments of the present disclosure. Referring to FIG. 8A, the peripheral heating elements 214 may have an open coil configuration and may extend in a lateral direction. In particular, the peripheral heating elements 214 may be annular and may be stacked in a vertical direction parallel to a stacking direction of the electrolyzer cells in the stacks 100. The peripheral heating elements 214 may be secured to support elements 220 disposed between an inner shell 304 and an outer shell of the hotbox. In some embodiments, the support elements 220 may be brackets formed of a dielectric material, such as a ceramic material. The outer shell 302 may be covered by an insulation layer 318.

Figure 8B:
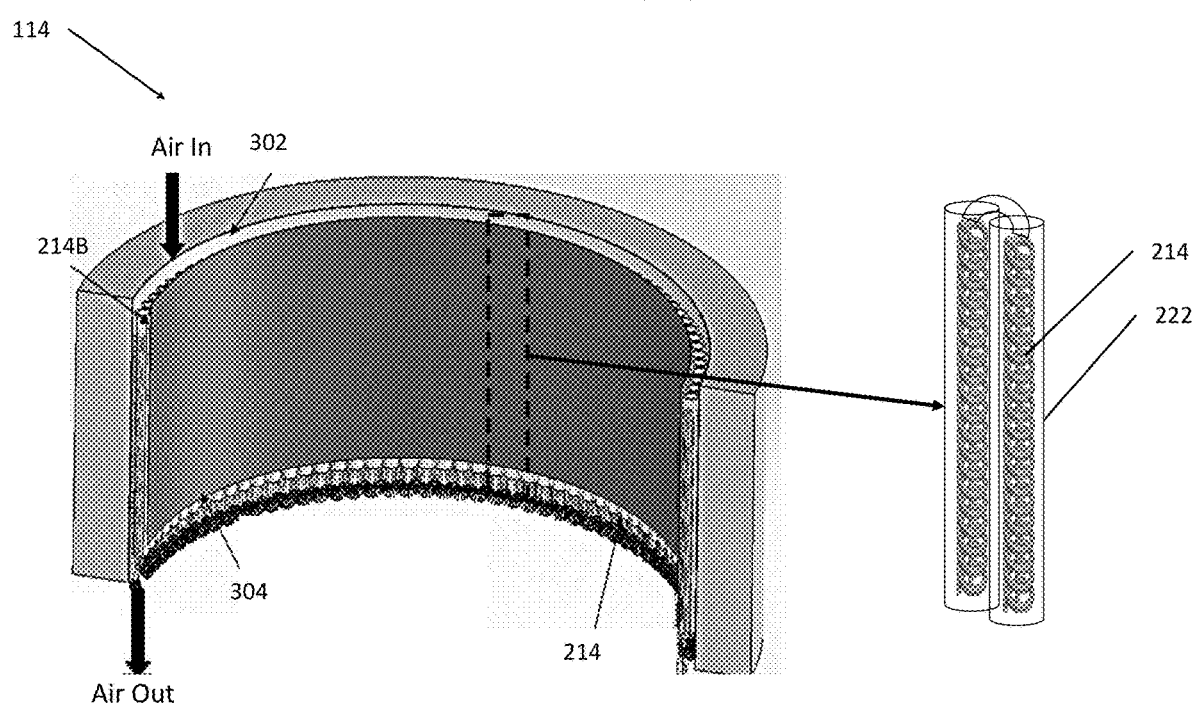

FIG. 8B is a cross-sectional perspective view of a portion of an air heater 114 that includes peripheral heating elements 214 and support elements 222 having an alternative structure, according to various embodiments of the present disclosure. Referring to FIG. 8B, the peripheral heating elements 214 may be coiled heating elements that extend vertically in a space between the inner shell 304 and the outer shell 302. The peripheral heating elements 214 may be disposed in tubular support elements 222 that extend vertically. The support elements 222 may comprise a heat-resistant dielectric material, such as a ceramic material, in some embodiments. The support elements 222 may be configured to electrically insulate the peripheral heating elements 214 from the inner shell 304 and the outer shell 302. The peripheral heating elements 214 may be electrically connected in series or in parallel, for example.

FIG. 8C is a perspective view of a portion of an air heater 114 that includes peripheral heating elements 214 having an alternative structure, according to various embodiments of the present disclosure, and FIG. 8D is a cross-sectional perspective view of the air heater 114 of FIG. 8C. Referring to FIGS. 8C and 8D, an insulation layer 318 may be disposed between an inner shell 304 and an outer shell 302. In some embodiments, the insulation layer 318 may be formed of a dielectric heat-resistant material, such as a ceramic material. The peripheral heating elements 214 may extend in a lateral direction and may be embedded in the insulation layer 318. Accordingly, the insulation layer 318 may electrically insulate the peripheral heating elements 214.

FIG. 8E is a perspective view of a portion of an air heater 114 that includes peripheral heating elements 214 having an alternative structure, according to various embodiments of the present disclosure. Referring to FIG. 8E, the peripheral heating elements 214 may be cylindrical and may be vertically stacked. The peripheral heating elements 214 may include fins 224 to improve heat dissipation. This type of heater geometry may be easier to assemble, as it can be manipulated in place and inserted manually around an inner shell 304.

Figure 8F:
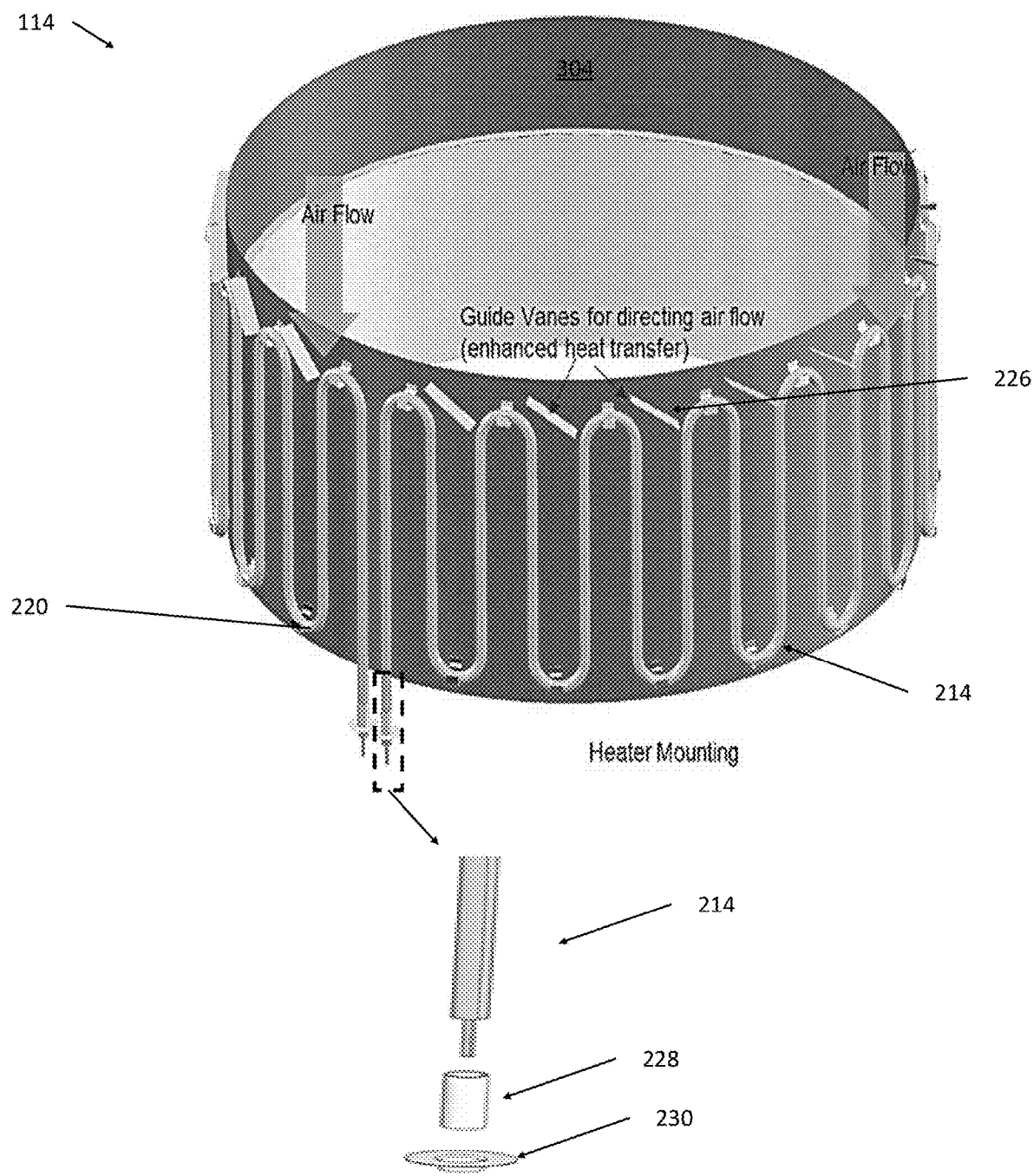

FIG. 8F is a perspective view of a portion of an air heater 114 that includes peripheral heating elements 214 having an alternative structure, according to various embodiments of the present disclosure. Referring to FIG. 8F, the peripheral heating elements 214 may be arranged on an inner shell 304 in a serpentine pattern. For example, the peripheral heating elements 214 may be clamped to the inner shell 304 using support elements 220. The air heater 114 may include guide vanes 226 configured to guide incoming air along the peripheral heating elements 214. The guide vanes 226 may include a planar top surface which is tilted with respect to the vertical air flow direction at an angle of 10 to 80 degrees, such as 30 to 60 degrees, to impart a radial flow to the air below the guide vanes 226. The peripheral heating elements 214 may include a metallic heating core encased in power insulation. Brazing tubes 228 may be brazed to ends of the cores of the heating elements 214 to provide support and electrical insulation. The brazing tubes 228 may be welded to top-hat shaped structures 230.

In various embodiments, the heating element structures of FIGS. 8A-8F may be applied to the peripheral heating elements 214, the central heating elements 216, and/or the bottom heating elements 218. For example, the central heating elements 216 may have a coiled configuration, may extend laterally or vertically, may have fins, and/or may be disposed in a support element such as a ceramic tube or ceramic spacer. In some embodiments, the central heating elements 216 may be clamped to the central column 320 by support elements 220, as shown below with respect to FIGS. 9A and 9B.

FIG. 9A is a schematic view showing an air heater 114 having a zoned configuration, according to various embodiments of the present disclosure. FIG. 9B is a perspective view showing a heating element of the air heater 114 of FIG. 9A. Referring to FIGS. 9A and 9B, the air heater may include peripheral heating elements 214 and central heating elements 216. Although not shown, the air heater 114 may also include bottom heating elements.

The peripheral heating elements 214 may be arranged in two or more zones, such as a first zone 214A and a second zone 214B. The first zone 214A may be disposed above and upstream from the second zone 214B, with respect to an air flow direction through the air heater 114. The central heating elements 216 may be arranged in two or more zones, such as a third zone 216A, a fourth zone 216B, and a fifth zone 216C. The third zone 216A may be disposed below and upstream of the fourth zone 216B, and the fourth zone 216B may be disposed below and upstream of the fifth zone 216C, with respect to the air flow direction.

The air heater 114 may include at least one power source 240 configured to independently control a voltage and/or current applied to the peripheral heating elements 214 in each of the zones 214A, 214B, 216A, 216B, 216C. For example, the air heater 114 may include separate power sources 240 to respectively apply power to each zone 214A, 214B, 216A, 216B, 216C, or to a single power source configured to independently control power supplied to each zone 214A, 214B, 216A, 216B, 216C. The heat output of the peripheral heating elements 214 of each zone 214A, 214B, 216A, 216B, 216C may be selectively controlled, such that air flowing through the air heater 114 has a temperature ranging from about 800° C. to about 950° C., such as from about 825° C. to about 875° C., or about 850° C. In particular, the power applied to the heating elements of each zone 214A, 214B, 216A, 216B, 216C, may be independently controlled, in order to provide thermal uniformity for air flowing through the air heater 114.

FIG. 10A is a cross-sectional view of the central column 320 including a modified steam heating element 110E, according to various embodiments of the present disclosure, and FIG. 10B is an enlarged portion of FIG. 10A. Referring to FIGS. 10A and 10B, the heating element 110E may be a vertical loop-type heating coil disposed inside of the central column 320. The heating element 110E may include a metallic heating core encased in insulation.

The heating element 110E may be brazed to brazing tubes 210 that include welding flanges. The welding flanges may be welded to a hotbox base plate 306, such that ends of the heating element 110E may be disposed below the central column 320. As such, exposed terminals of the heating element 110E may be protected from steam exposure, thereby enhancing the reliability and cycle life of the heating element 110E.

In operation, steam from the connection conduit 330 may flow downward through the steam recuperator 108, before exiting the bottom of the steam recuperator 108 and flowing upward along the housing 110H of the steam heater 110. In this embodiment, the steam recuperator 108 is located upstream of the steam heater 110, as shown in FIG. 2A. The steam may then flow upward to the top of the housing 110H before entering the housing 110H and flowing downward while being heated by the steam heating element 110E. The superheated steam may then exit the bottom of the steam heater 110 and flow into the steam distribution conduits 340S, which may provide the superheated steam to corresponding stacks 100.

FIG. 11 is a cross-sectional perspective view showing air flow through a modified hotbox 300A, according to various embodiments of the present disclosure. The hotbox 300A may be similar to the hotbox 300, as such, only the differences there between will be discussed in detail.

Referring to FIG. 11, air (i.e. air inlet stream) may enter the hotbox 300A through the air inlet conduit 322, flow through the air preheater 328 and the shoulder manifold 334, before entering an inner chamber of the air recuperator 112. Air exiting the bottom of the air recuperator 112 may flow radially inward to enter the stacks 100. Ceramic side baffles 342 located on the sidewalls of the SOEC stack 100 columns keep the air flowing from the air recuperator 112 into the stacks 100.

Oxygen exhaust exiting the stacks 100 may flow radially inwards and then along the outer surface of the steam heater 110 wherein the oxygen exhaust (i.e., oxygen rich air stream) is optionally heated by central heating elements 216 of the air heater 114. Alternatively, the central heating elements 216 may be omitted. The heated oxygen exhaust then flows under the stacks 100 around distribution hub 340, and into the air heater 114. Oxygen exhaust flowing through the air heater 114 may be heated by the peripheral heating elements 214. The heated oxygen exhaust may enter an outer chamber of the air recuperator 112 and heat incoming air in the internal chamber of the air recuperator 112. The oxygen exhaust may then flow through the water preheater 102 where it preheats the water flowing through the coiled water pipes 103 and the air flowing through the shoulder manifold 334, prior to being exhausted through the air outlet conduits 316.

FIG. 12 is a cross-sectional perspective view showing air flow through a modified hotbox 300B, according to various embodiments of the present disclosure. The hotbox 300B may be similar to the hotbox 300, as such, only the differences there between will be discussed in detail.

Referring to FIG. 12, air may enter the hotbox 300B through the air inlet conduit 322, flow through the optional air preheater 328 and then into an internal air recuperator 112, disposed around the perimeter of the central column 320. For example, the internal air recuperator 112 may surround the steam heater 110. The internal air recuperator 112 may include inner and outer chambers 112C1, 112C2, as shown in FIG. 5C, through which air and oxygen exhaust flow. In particular, the internal air recuperator 112 may be configured to heat air provided to the central column 320 by extracting heat from the oxygen exhaust output from the stacks 100. The air may also be heated by excess heat generated by the steam heater 110. The air may exit the air recuperator 112, flow radially outward under the stacks 100 and around the distribution hub 340, and then upward to enter the air heater 114. The air may be heated by the peripheral heating element 214, before exiting the air heater 114 and flowing radially inward to enter the stacks 100.

Oxygen exhaust exiting the stacks 100 may flow radially inward into an outer chamber of the air recuperator 112 and heat incoming air in the inner chamber of the air recuperator 112. The oxygen exhaust may then flow upwards and pass radially outward through the water preheater 102 and then be exhausted from the hotbox 300B through the air outlet conduits 316.

Referring to FIGS. 11 and 12, the disclosed hotbox configurations allow for incoming air to be heated by oxygen exhaust. This may allow for central heating elements 216 to be omitted from the air heaters 114. As such, the air heaters 114 may include only the peripheral heating elements 214, which can be serviced without entering the hotboxes 300A, 300B. The flow of water and steam through the hotboxes 300A, 300B may be the same as described with respect to the hotbox 300.

The preceding description of the disclosed aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein but is to be accorded the widest scope consistent with the principles and novel features disclosed herein.

The invention claimed is:

1. An electrolyzer system, comprising:
   a hotbox;
   a central column disposed in the hotbox and extending lengthwise in a vertical direction;
   stacks of solid oxide electrolyzer cells disposed in the hotbox, surrounding the central column, and configured to convert steam into a hydrogen stream; and
   an air heater configured to heat air provided to the stacks, wherein the air heater comprises peripheral heating elements disposed radially around the stacks, between an inner shell and an outer shell of the hotbox.

2. The electrolyzer system of claim 1, further comprising support elements configured to support the peripheral heating elements and maintain a spacing between the inner shell and the outer shell.

3. The electrolyzer system of claim 2, wherein the support elements comprise a ceramic material.

4. The electrolyzer system of claim 2, wherein:
   the support elements comprise ceramic tubes that extend in the vertical direction; and
   the peripheral heating elements are elements respectively disposed within the ceramic tubes.

5. The electrolyzer system of claim 1, wherein the peripheral heating elements comprise coiled heating elements or finned heating elements.

6. The electrolyzer system of claim 1, wherein the peripheral heating elements comprise vertically-stacked annular heating elements or serpentine heating elements.

7. The electrolyzer system of claim 1, further comprising an insulation layer disposed on the outer shell, surrounding the peripheral heating elements.

8. The electrolyzer system of claim 1, further comprising guide vanes disposed between the inner shell and the outer shell, the guide vanes configured to radially direct flow of the air through the air heater.

9. The electrolyzer system of claim 1, wherein the air heater further comprises central heating elements disposed between the central column and the stacks, the central heating elements configured to heat air after the air is heated by the peripheral heating elements.

10. The electrolyzer system of claim 9, wherein the air heater further comprises bottom heating elements disposed below the stacks, the bottom heating elements configured to heat air flowing from the peripheral heating element to the central heating elements.

11. The electrolyzer system of claim 9, wherein:
    the peripheral heating elements are arranged in at least two groups, and the central heating elements are arranged in at least three groups; and
    the air heater further comprises at least one power source configured to independently apply power to each group of the peripheral heating elements and each group of central heating elements.

12. The electrolyzer system of claim 9, further comprising a steam generator disposed outside of the hotbox and configured to vaporize water into steam and to provide the steam to the central column.

13. The electrolyzer system of claim 9, further comprising a steam generator disposed inside of the central column, and configured to vaporize water into steam.

14. The electrolyzer system of claim 13, wherein the steam generator comprises a heating element configured to vaporize water flowing through the steam generator.

15. The electrolyzer system of claim 14, wherein:
    the steam generator comprises a vaporizing manifold configured to receive water provided to the central column; and
    the heating element is configured to vaporize water flowing through the vaporizing manifold.

16. The electrolyzer system of claim 13, wherein the electrolyzer system is configured to evaporate mineralized water output from the steam generator in oxygen exhaust generated by the stacks and output from the hotbox.

17. The electrolyzer system of claim 9, further comprising an air recuperator disposed in the hotbox and configured to heat air provided to the air heater using oxygen exhaust output from the stacks.

18. An electrolyzer system, comprising:
    a hotbox;
    a central column disposed in the hotbox and extending lengthwise in a vertical direction;
    stacks of solid oxide electrolyzer cells disposed in the hotbox, surrounding the central column, and configured to convert steam into a hydrogen stream;
    an air heater configured to heat air provided to the stacks; and
    an insulation layer disposed between the inner shell and the outer shell,
    wherein the air heater comprises peripheral heating elements that are embedded in the insulation layer and radially surround the stacks.

19. An electrolyzer system, comprising:
    a hotbox;
    a central column disposed in the hotbox;

stacks of solid oxide electrolyzer cells disposed in the hotbox, surrounding the central column, and configured to receive steam and air and to output a hydrogen exhaust and an oxygen exhaust;

an air recuperator configured to preheat the air provided to the hotbox by extracting heat from the oxygen exhaust output from the stacks;

an air heater configured to heat preheated air output from the air recuperator and provide heated air to the stacks; and a steam heater disposed in the central column and configured to superheat steam provided to the stacks.

20. The electrolyzer system of claim 19, wherein the air recuperator surrounds the stacks.

21. The electrolyzer system of claim 20, wherein oxygen exhaust output from the stacks is configured to flow along the central column, under the stacks, and then through the air recuperator, before exiting the hotbox.

22. The electrolyzer system of claim 21, wherein air provided to the hotbox is configured to flow into the central column, and through the air recuperator, before entering the stacks.

23. The electrolyzer system of claim 20, wherein the air heater comprises one or more heating elements disposed between an inner shell and an outer shell of the hotbox.

24. The electrolyzer system of claim 19, wherein the air recuperator surrounds the central column and is surrounded by the stacks.

25. The electrolyzer system of claim 24, wherein oxygen exhaust output from the stacks is configured to flow through the air recuperator before exiting the hotbox.

26. The electrolyzer system of claim 25, wherein air provided to the hotbox is configured to flow into the central column, through the air recuperator, under the stacks, and then through the air heater, before entering the stacks.

27. The electrolyzer system of claim 19, further comprising a water preheater configured to preheat water provided to the hotbox using heat extracted from oxygen exhaust output from the air recuperator.

28. The electrolyzer system of claim 19, further comprising a distribution hub disposed below the stacks and the central column, the distribution hub configured to provide superheated steam from the central column to the stacks, and to provide hydrogen output from the stacks to the central column.

* * * * *